United States Patent [19]
Katsuyama et al.

[11] Patent Number: 5,197,107
[45] Date of Patent: Mar. 23, 1993

[54] CHARACTER RECOGNITION APPARATUS

[75] Inventors: Yutaka Katsuyama, Machida; Hiroshi Iwaki; Takafumi Edanami, both of Yokohama; Noriyuki Fukuyama, Hachioji, all of Japan

[73] Assignee: Fujitsu Limited, Kawasaki, Japan

[21] Appl. No.: 474,767

[22] PCT Filed: Jul. 20, 1989

[86] PCT No.: PCT/JP89/00728
§ 371 Date: Mar. 20, 1990
§ 102(e) Date: Mar. 20, 1990

[87] PCT Pub. No.: WO90/01198
PCT Pub. Date: Feb. 8, 1990

[30] Foreign Application Priority Data

| Apr. 26, 1988 | [JP] | Japan | 63-186048 |
| Jul. 20, 1988 | [JP] | Japan | 63-179157 |
| Jul. 20, 1988 | [JP] | Japan | 63-179158 |
| Nov. 8, 1988 | [JP] | Japan | 63-283379 |
| Nov. 21, 1988 | [JP] | Japan | 63-295642 |
| Dec. 28, 1988 | [JP] | Japan | 63-332393 |
| Apr. 20, 1989 | [JP] | Japan | 1-100844 |

[51] Int. Cl.⁵ ............................................ G06K 9/62
[52] U.S. Cl. .................................. 382/30; 382/9; 382/48
[58] Field of Search ....................... 382/9, 30, 34, 48

[56] References Cited

U.S. PATENT DOCUMENTS

| 4,601,054 | 7/1986 | Watari et al. | 382/34 |
| 4,606,069 | 8/1986 | Johnsen | 382/34 |
| 4,641,355 | 2/1987 | Hongo et al. | 382/34 |
| 4,701,961 | 10/1987 | Hongo | 382/34 |
| 4,769,851 | 9/1988 | Nishijima et al. | 382/34 |
| 4,837,842 | 6/1989 | Holt | 382/34 |
| 4,887,303 | 12/1989 | Hongo | 382/34 |
| 4,977,603 | 12/1990 | Irie et al. | 382/34 |

FOREIGN PATENT DOCUMENTS

| 60-167070 | 8/1985 | Japan |
| 60-246490 | 12/1985 | Japan |
| 61-163472 | 7/1986 | Japan |
| 62-119690 | 5/1987 | Japan |
| 63-129484 | 6/1988 | Japan |

Primary Examiner—Jose Couso
Attorney, Agent, or Firm—Staas & Halsey

[57] ABSTRACT

A character recognition apparatus for detecting a character which is represented by an image data, by extracting a characteristic quantity of the character from the image data of the character, and comparing the characteristic quantity with characteristic quantities of characters which are memorized in a dictionary. Before the above comparison, a modification of the above characteristic quantity which is extracted from the image data is carried out, where the modification corresponds to a magnification or reduction of the scale of the above image data to equalize the scale of the above image data of the character with the scales of the characters of which the characteristic quantities are memorized in the above dictionary. Further, a magnification or reduction of the width of the character image to equalize the width of the character image with the width of the characters of which the characteristic quantities are memorized in the above dictionary.

21 Claims, 29 Drawing Sheets (1,1)　　　　　(1,8)

(8,1)　　　　　(8,8)

$(A_{8,1}, B_{8,1}, C_{8,1}, D_{8,1})$
$= (11, 0, 2, 4)$

FIG. 5
PRIOR ART
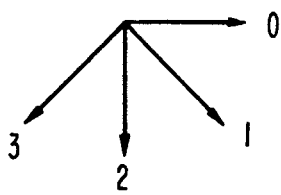
FIG. 6
PRIOR ART
| $A_{m,n}$ |   |   |    |   |   |   |   |
|---|---|---|---|---|---|---|---|
| 0 | 0 | 0 | 10 | 6 | 0 | 0 | 0 |
| 0 | 0 | 2 | 7  | 2 | 1 | 0 | 0 |
| 0 | 0 | 5 | 4  | 3 | 6 | 0 | 0 |
| 0 | 0 | 8 | 0  | 3 | 6 | 0 | 0 |
| 0 | 3 | 8 | 13 | 9 | 3 | 1 | 0 |
| 0 | 3 | 12| 13 | 12| 5 | 5 | 0 |
| 1 | 3 | 1 | 0  | 0 | 4 | 4 | 1 |
| 11| 12| 7 | 0  | 6 | 12| 13| 18|
(with layers $B_{m,n}$, $C_{m,n}$, $D_{m,n}$)
FIG. 7
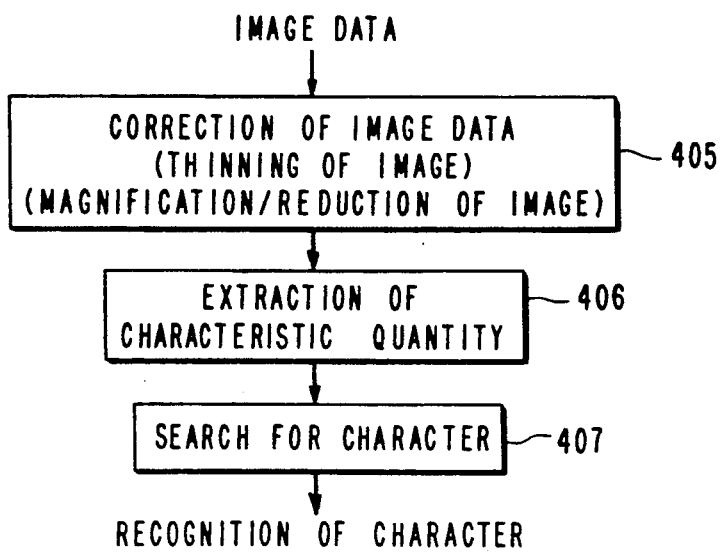

FIG. 18

| UNKNOWN CHARACTER VECTOR | CHARACTER | CHARACTER CODE (CHARACTERISTIC VECTOR PATTERN) | POWER |
|---|---|---|---|
| (3,5,2,···,1,5) | | 3 0 2 1 H<br>(2,5,1,···,0,5) | 213 |
| | | 3 0 2 2 H<br>(3,5,7,···,2,4) | 247 |
| | · | | · |
| | · | | · |
| | · | | · |
| | | 4 F 5 3 H<br>(0,0,1,···,0,3) | 310 |

FIG. 19

| CHARACTER CODE | DISTANCE | 1/(DEGREE OF SIMILARITY)(DISTANCE/213) |
|---|---|---|
| 3 0 2 1 H | 84 | 0.394 |
| 3 0 5 4 H | 150 | 0.704 |
| 3 0 2 2 H | 250 | 1.174 |
| 4 8 5 D H | 262 | 1.230 |
| 3 D 4 5 H | 275 | 1.291 |
| 4 3 5 6 H | 280 | 1.316 |
| 4 5 2 2 H | 236 | 1.390 |
| 3 6 4 5 H | 311 | 1.460 |

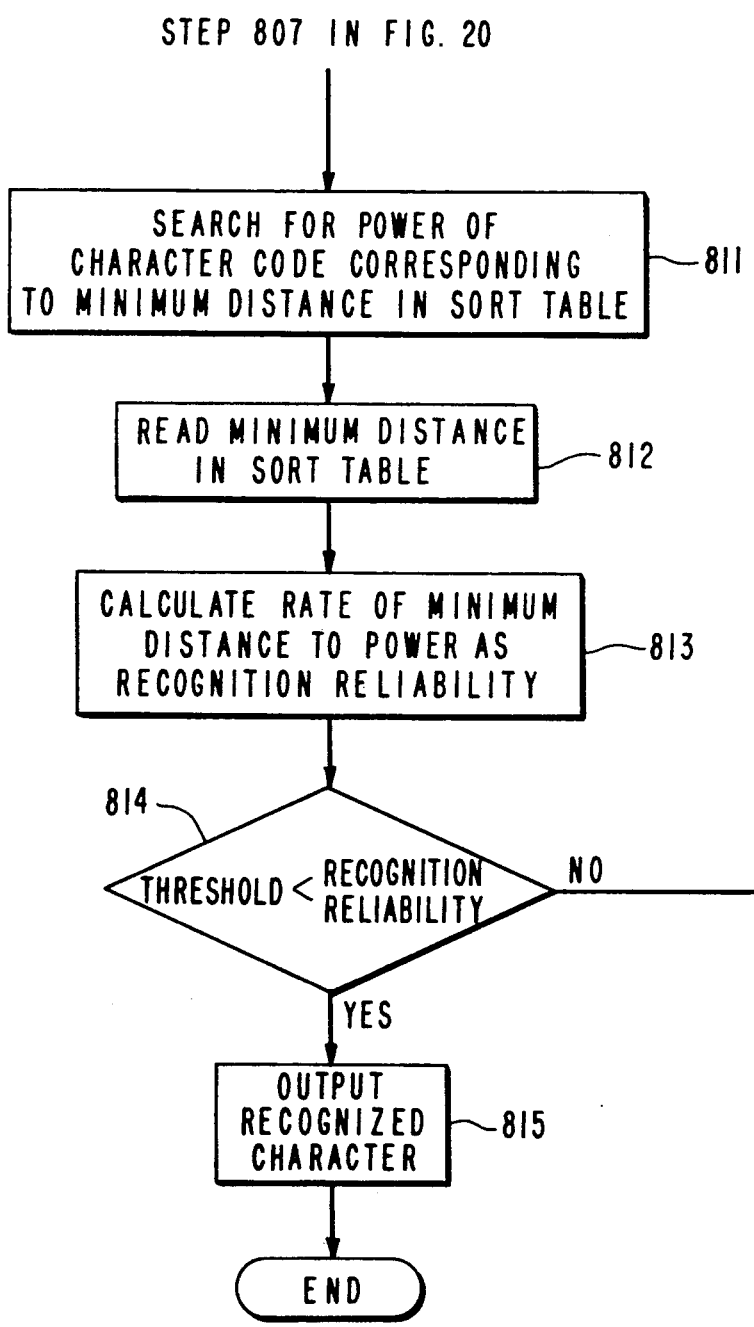

<RECTANGULAR REGION>

(HORIZONTAL HISTOGRAM)

CHARACTER RECOGNITION APPARATUS

BACKGROUND OF THE INVENTION

1. Field of the Invention

The present invention relates to a character recognition apparatus. The present invention relates, in particular, to a character recognition apparatus which inputs image information including characters such as those in a document, as image data, by an image scanner or a facsimile, extracts a characteristic quantity of a character from the image data, compares the extracted characteristic quantity with standard characteristic quantities which are memorized in a dictionary, and recognizes the character.

2. Description of the Related Art

FIG. 1 shows a flow of main processes in the conventional character recognition apparatus.

In the step 401, the image of a document, characters which are to be recognized, is input as image data by an image scanner or the like, and is stored in a memory.

In the step 402, a region wherein successive character strings, i.e., a region wherein sentences are printed, is extracted and distinguished from other regions such as a picture, or a drawing, or the like.

In the step 403, a region of each character string is extracted from the above region wherein sentences are printed.

In the step 404, a region of each character (a character image) is extracted from the above character string.

In the step 406, a characteristic quantity of the character is extracted from the above modified character image by a predetermined procedure.

In the step 407, the above extracted characteristic quantity is compared with each of the plurality of characters which are memorized in the dictionary, one by one, and then a character which is most similar to the extracted characteristic quantity is recognized as a character which the above character image represents (step 488).

Next, in the step 489, it is determined whether or not the result of above character recognition is correct. If it is determined that the above recognition result is incorrect, a correction is carried out in the step 490, and the corrected character recognition result is stored in the memory in the step 491.

An example of the above procedure for extracting a characteristic quantity is shown in FIGS. 2 to 6.

Namely, when a character image as shown in FIG. 2 is extracted from an image which is input by an image scanner or the like, next, a contour of the character image is extracted as shown in FIG. 3, and the contour image is divided into a n×m (for example, 8×8) meshes. Then, the above contour line is decomposed into directional line segments in each mesh as shown in FIG. 4, and the number of directional line segments in each direction is detected in each mesh. FIG. 4 is a magnified view of the mesh (8, 1) of FIG. 3, where the mesh (8, 1) is divided into a further fine 8×8 meshes. Then, aspects of connection of contour points on the contour of the character image in the respective meshes are accumulated for four directions as shown in FIG. 5 to extract a characteristic quantity $(A_{i,j}, B_{i,j}, D_{i,j})$.

Here, the above directions can be classified, for example, as shown in FIG. 5, into four directions: a right-left direction, a right-down direction, an up-down direction, and a left down direction, where the right-left direction is denoted by "0", the right-down direction is denoted by "1", the up-down direction is denoted by "2", and the left-down direction is denoted by "3". In the determination result of FIG. 4, $A_{i,j}$, $B_{i,j}$, $C_{i,j}$, $D_{i,j}$, respectively denote a number of directional line segments in the direction "0", a number of directional line segments in the direction "1", a number of directional line segments in the direction "2", and a number of directional line segments in the direction "3", in the mesh i,j. Thus, the characteristic quantity $(A_{8,1}, B_{8,1}, C_{8,1}, D_{8,1})$ of FIG. 4 is (11, 0, 2, 4). Namely, a four-dimensional vector quantity, which four dimensions correspond to the above four directions, is extracted in each mesh, and thus, four-dimensional vector quantities $(A_{i,j}, B_{i,j}, C_{i,j}, D_{i,j})$ are obtained for all the meshes as shown in FIG. 6. When the meshes are 8×8, a 256-dimensional vector quantity is obtained as a characteristic quantity of a character by a direct product of the above 8×8 four-dimensional vector quantities $(A_{i,j}, B_{i,j}, C_{i,j}, D_{i,j})$.

Generally, in character recognition apparatuses, the following are required: a recognition rate is high (the number of erroneous recognitions is small); a time necessary to obtain a recognition result is short; a processing speed is high; a hardware size is small; and an operation for recognizing a character is simple and can be effectively carried out.

However, in the above-mentioned conventional character recognition apparatus, when a font corresponding to the characteristic quantities memorized in the dictionary, and a font of the image data which is input are different, or when sizes of characters memorized in the dictionary, and a size of a character of the image data which is input are different, the content of the dictionary is replaced with the characteristic quantity of the image data, or with a weighted average of the content of the dictionary and the characteristic quantity of the image data, every time an incorrect recognition occurs. In the above conventional character recognition apparatus, if replaced with the characteristic quantity of the image data, variation of the characteristic quantities memorized in the dictionary is large, or if replaced with the weighted average of the content of the dictionary and the characteristic quantity of the image data, a response (learning speed) of the dictionary to variation of input image data is slow. In either case, the above situations tend to cause an erroneous recognition, and the above replacing procedures make operations bothersome.

Another problem in the above conventional character recognition apparatus is that, when a small deformation occurs in an input image data due to a slippage of a position of the image data or a variation of concentration or a blur, the deformation is recognized as a characteristic feature of a character, and causes a degradation of a recognition rate.

Still another problem in the above conventional character recognition apparatus is that, an incorrect recognition must be detected by operator's eyes by finding an unnatural sentence obtained by an incorrect recognition, or by comparing recognition result with input image data, i.e., operations are bothersome and inefficient.

A further problem in the above conventional character recognition apparatus is that, in the above comparison with the input image data, it is bothersome and inefficient to locate a corresponding portion of the input image data when a recognized character seems to be incorrect.

A still further problem in the above conventional character recognition apparatus of FIG. 1, is that, in the step 402, a region wherein successive character strings, i.e., a region wherein sentences are printed, is extracted from other regions of a continuous image such as a picture, or a drawing, or the like, a labeling of each dot regarding which region each dot belongs to, is carried out dot by dot, or a similar labeling is carried out for each small region after the input image data is divided into a number of small regions. When the former labeling is carried out, an amount of data which is processed is large, a large size of hardware and a long processing time are necessary, due to the dot-by-dot labeling. In the latter labeling, when the sizes of the small regions are large, a processing speed is large, but resolution is low, or when the sizes of the small regions are made small to improve the resolution, the processing speed becomes low, and the large size of hardware such as a large memory, is necessary.

SUMMARY OF THE INVENTION

An object of the present invention is to provide a character recognition apparatus which can easily respond to a small deformation in an input image data due to a slippage of a position of the image data or variation of concentration or a blur, and in which apparatus a processing is simple, and therefore is fast, hardware size is small, operations of character recognition are simple, and are efficiently carried out, and further, an incorrect recognition can be easily detected and easily compared with an original image data.

According to a first aspect of the present invention, there is provided a character recognition apparatus, comprising: a dictionary for memorizing characteristic quantities of characters; a characteristic quantity extracting means for extracting a characteristic quantity of a character from an image data; and a character search means for determining a character represented by an image data, by comparing the characteristic quantity which is extracted from the image data, with the characteristic quantities of characters which are memorized in the dictionary. The above character recognition apparatus is characterized in further comprising a character image modification means for carrying out a modification of an image data which represents a character, where the modification includes magnification or reduction of the scale of a character image and thickening or thinning of a character image, which magnification or reduction and thickening or thinning are each characterized by one or more parameters.

According to a second aspect of the present invention, there is provided a character recognition apparatus, comprising: a dictionary for memorizing characteristic quantities of characters; a characteristic quantity extracting means for extracting a characteristic quantity of a character from an image data; and a character search means for determining a character represented by an image data, by comparing the characteristic quantity which is extracted from the image data, with the characteristic quantities of characters which are memorized in the dictionary. The above character recognition apparatus is characterized in further comprising a characteristic quantity magnification/reduction means for carrying out a modification of the above characteristic quantity which is extracted from the above image data, where the modification is equivalent to a magnification or reduction of the above image data to equalize the scale of the above image data of the character with the scales of standard characters, based on which the characteristic quantities memorized in the above dictionary are made, before the above comparison.

According to a third aspect of the present invention, there is provided a character recognition apparatus, comprising: a dictionary for memorizing characteristic quantities of characters; a characteristic quantity extracting means for extracting a characteristic quantity of a character from an image data; and a character search means for determining a character represented by an image data, by comparing the characteristic quantity which is extracted from the image data, with the characteristic quantities of characters which are memorized in the dictionary. The above character recognition apparatus is characterized in further comprising: a character image modification means, provided in the preceding stage of the above character search means, for carrying out a modification including thickening or thinning of an image data representing a character, where the above modification is characterized by one or more parameters; and a characteristic quantity magnification/reduction means, provided in the preceding stage of the above characteristic quantity extracting means, for carrying out a modification of a characteristic quantity extracted from the above image data, where the modification includes a magnification or reduction, and is characterized by one or more parameters.

According to a fourth aspect of the present invention, there is provided a character recognition apparatus, comprising the same construction as either of the above first to third aspects of the present invention, and further, the above magnification or reduction of the scale in the above characteristic quantity magnification/reduction means is characterized by one or more parameters which corresponds to the magnification or reduction; and the above character recognition apparatus further comprises an optimum parameter determining means for obtaining an optimum parameter by carrying out a modification of a characteristic quantity which is extracted from a known image data, where the modification corresponds to the magnification or reduction of the scale using each of a predetermined number of parameters, and then comparing the modified characteristic quantity with a characteristic quantity which is memorized in the dictionary and corresponds to the above known image data.

According to a fifth aspect of the present invention, there is provided a character recognition apparatus, wherein the above comparison in the above character search means as in the above-mentioned fourth aspect of the present invention, is carried out by obtaining values which indicate degrees of similarity between the above characteristic quantity extracted from the above image data and respective characteristic quantities memorized in the above dictionary; the above determination of the character in the above character search means is carried out by obtaining a character which has the highest similarity among the characters in the dictionary based on the above values. The above character recognition apparatus is characterized in further comprising: a low degree of similarity determining means for determining whether or not a degree of similarity of a determined character is equal to or below a first threshold value; and an optimum parameter determination starting means for obtaining an optimum parameter by restarting the above optimum parameter determining means when the degree of similarity of the determined character is equal to or below the first threshold value.

According to a sixth aspect of the present invention, there is provided a character recognition apparatus, comprising the same construction as either of the above first to fifth aspects of the present invention, and further, wherein the above characteristic quantity is expressed by a vector quantity comprised of a plurality of components; the above values which quantitatively indicate degrees of similarity is a function of absolute values of differences between respective corresponding components of the vectors of the above characteristic quantity extracted from the above image data and a characteristic quantity memorized in the above dictionary. The above character recognition apparatus is characterized in further comprising: a small difference determining means for determining whether or not each of the above absolute values of differences between the above corresponding components, is equal to or below a second threshold value, in the above comparison; and an error accumulation preventing means for replacing each absolute value among the above absolute values of differences between the above corresponding components, with zero, before the above operation of obtaining the values which indicate degrees of similarity, when the absolute value is equal to or below the second threshold value.

According to a seventh aspect of the present invention, there is provided a character recognition apparatus, comprising the same construction as either of the above first to sixth aspects of the present invention, and further, wherein the above comparison in the above character search means is carried out by obtaining values which indicate degrees of similarity between the above characteristic quantity extracted from the above image data and respective characteristic quantities memorized in the above dictionary; the above determination of the character in the above character search means is carried out by obtaining a character which has the highest similarity among the characters in the dictionary based on the above values. The above character recognition apparatus is characterized in further comprising: an erroneous recognition character determining means for determining whether or not the determined degree of similarity is equal to or below a third threshold value when each character is determined; and an erroneous recognition character indicating means for indicating that the above character is determined based on an inaccurate recognition, when the determined degree of similarity is equal to or below the third threshold value.

According to an eighth aspect of the present invention, there is provided a character recognition apparatus, comprising the same construction as either of the above second to seventh aspects of the present invention, and further, comprising: an image input means for inputting an image of a document comprised of character strings, as an image data; a character region extracting means for extracting a character region indicating an individual character, from the above image data; a dictionary for memorizing characteristic quantities of characters; a characteristic quantity extracting means for extracting a characteristic quantity from the image data in the above character region; a character search means for determining a character represented by an image data, by comparing the characteristic quantity which is extracted from the image data, with the characteristic quantities of characters which are memorized in the dictionary; and a text displaying means for displaying the above determined characters on a display apparatus, in the order that the corresponding character regions are located in the above image of the document. The above character recognition apparatus is characterized in further comprising: a characteristic quantity magnification/reduction means for carrying out a modification of the above characteristic quantity which is extracted from the above image data, where the modification is equivalent to a magnification or reduction of the above image data to equalize the scale of the above image data of the character with the scales of standard characters, based on which the characteristic quantities memorized in the above dictionary are made, before the above comparison; and a text image coordinate-corresponding memorizing means for memorizing a coordinate of each character for displaying the character on the above display apparatus by the above text displaying means, with a correspondence to a coordinate of a corresponding character region in the original image data.

According to a ninth aspect of the present invention, there is provided a character recognition apparatus, comprising the same construction as either of the above second to eighth aspects of the present invention, and further, comprising: a successive character strings region recognizing means for recognizing a successive character strings region including successive character strings, in an image of a document comprised of a character strings region including a successive character strings which are printed with intervals within a predetermined range, and a continuous image region; a character string region recognizing means for recognizing each character string in the above character strings region; a character region recognizing means for recognizing each character region indicating an individual character, from the above image data; a dictionary for memorizing characteristic quantities of characters; a characteristic quantity extracting means for extracting a characteristic quantity from the image data in the above character region; and a character search means for determining a character represented by an image data, by comparing the characteristic quantity which is extracted from the image data, with the characteristic quantities of characters which are memorized in the dictionary. The above character recognition apparatus is characterized in further comprising a characteristic quantity magnification/reduction means for carrying out a modification of the above characteristic quantity which is extracted from the above image data, where the modification is equivalent to a magnification or reduction of the above image data to equalize the scale of the above image data of the character with the scales of standard characters, based on which the characteristic quantities memorized in the above dictionary are made, before the above comparison; and the above successive character strings region recognizing means comprises, an X-direction /Y-direction space string region extracting means for extracting a string region consisting of successive spaces (0 data) extending over a predetermined width and over a predetermined length, in each of the X and Y directions; an intermediate image composing means for composing a logical multiplication of an X-direction intermediate image and a Y-direction intermediate image, where all data in the above X-direction space string region is "zero" and all other data is "one" in the above X-direction intermediate image, and all data in the above Y-direction space string region is "zero" and all other data is "one" in the above Y-direction intermediate image; a successive data "one" region recognizing means for recognizing a successive data "one" region in an image which is obtained by the above composing operation, in a manner that a label is assigned to each group of successive string regions in the image obtained by the above composing operation, where each string region in the group contains data "one" only, extends over a predetermined width and over a predetermined length in the X-direction or the Y-direction, and is located adjacent to the other string region in the group; and a character string region determining means for determining a part of the original image data corresponding to a projected image as a character string region when the width of the projected image is equal to or less than a predetermined width, where the above projected image is obtained by projecting the original image data in the direction of the character string in a region of the original image corresponding to the above successive data "one" region.

BRIEF DESCRIPTION OF DRAWINGS

FIGS. 2 to 6 show a process for extracting a characteristic quantity;

FIGS. 7 to 9 show the first to third aspects of the present invention;

FIG. 18 shows a correspondence between a characteristic quantity (256-dimensional) vector which is extracted from an image data, and a characteristic quantity vector in the dictionary;

FIG. 19 shows an example of a sort table;

FIGS. 22A and 22B shows a control process in the embodiment of the fifth aspect of the present invention;

DESCRIPTION OF THE PREFERRED EMBODIMENTS

Before describing the concrete embodiment of the present invention, first, the characteristic feature of the present invention is explained below.

FIG. 7 shows a basic process in the character recognition apparatus according to the first aspect of the present invention.

As shown in FIG. 7, and as described before under the subheading "SUMMARY OF THE INVENTION", in the first aspect of the present invention, first, a modification of an image data which represents a character, where the modification includes magnification or reduction of the scale of a character image and thickening or thinning of a character image, which magnification or reduction and thickening or thinning are each characterized by one or more parameters, is carried out in the character image modification means 405. Then, in the characteristic quantity extracting means 406, a characteristic quantity of a character is extracted from an image data, and then, in the character search means 407, a character represented by an image data, is determined by comparing the characteristic quantity which is extracted from the image data, with the characteristic quantities of characters which are memorized in the dictionary 400.

According to the first aspect of the present invention, a modification of an image data which represents a character, where the modification includes magnification or reduction of the scale of a character image and thickening or thinning of a character image, which magnification or reduction and thickening or thinning are each characterized by one or more parameters, can be carried out by appropriately setting the parameters in the character image modification means, without modifying characteristic quantities in the dictionary.

Figure 8:
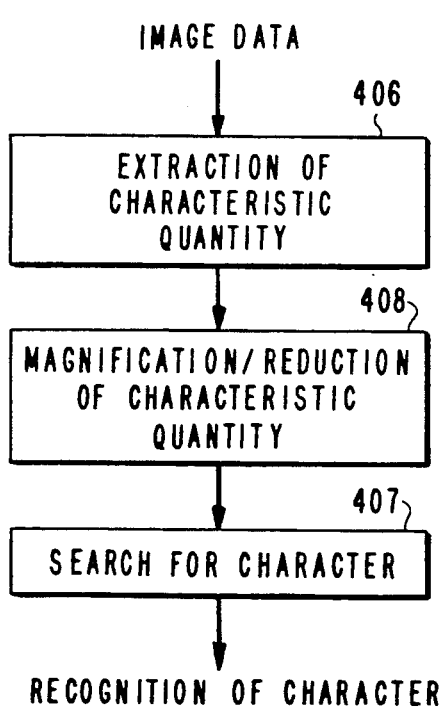

FIG. 8 shows a basic process in the character recognition apparatus according to the second aspect of the present invention.

As shown in FIG. 8, and as described before under the subheading "SUMMARY OF THE INVENTION", in the second aspect of the present invention, first, a modification of the above characteristic quantity which is extracted from the above image data, where the modification is equivalent to a magnification or reduction of the above image data to equalize the scale of the above image data of the character with the scales of standard characters, based on which the characteristic quantities memorized in the above dictionary are made, before the above comparison, is carried out in the characteristic quantity magnification/reduction means 408. Then, in the character search means 407, a character represented by an image data is determined by comparing the characteristic quantity which is extracted from the image data, with the characteristic quantities of characters which are memorized in the dictionary.

According to the second aspect of the present invention, a modification of the above characteristic quantity which is extracted from the above image data, where the modification is equivalent to a magnification or reduction of the above image data, which magnification or reduction is characterized by one or more parameters, can be carried out by appropriately setting the parameters in the characteristic quantity magnification/reduction means 408, without modifying characteristic quantities in the dictionary.

The algorithm for carrying out a magnification/reduction process of an image data is complicated, and a long time is necessary for the process. Further, for example, when an image data of an oblique line is magnified, the original image is deformed, e.g., the oblique image is transformed to a step-like image, and thus, recognition rate is lowered. According to the second aspect of the present invention, the above modification of the above characteristic quantity which is extracted from the above image data, where the modification is equivalent to a magnification or reduction of the above image data, which magnification or reduction is characterized by one or more parameters, makes the magnification/reduction process simple, and a time for carrying out the magnification/reduction process is reduced. Further, when a characteristic quantity of an oblique image data is processed corresponding to image magnification, deformation does not occur.

Figure 9:
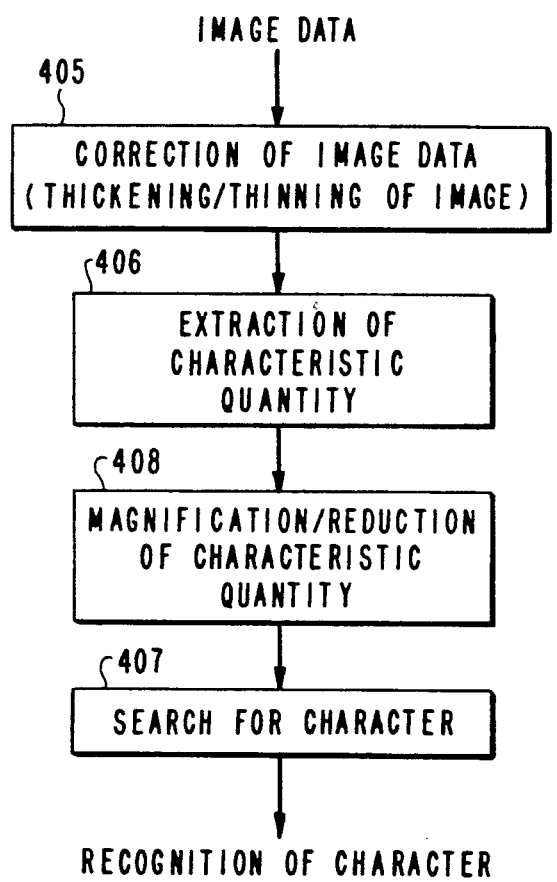

FIG. 9 shows a basic process in the character recognition apparatus according to the second aspect of the present invention.

As shown in FIG. 9, and as described before under the subheading "SUMMARY OF THE INVENTION", in the third aspect of the present invention, first, a modification including thickening or thinning of an image data representing a character, where the above modification is characterized by one or more parameters, is carried out. Next, in the characteristic quantity extracting means 406, a characteristic quantity of a character from an image data, is extracted in the character image modification means 405'. Then, in the characteristic quantity magnification/reduction means 408, for carrying out a modification of a characteristic quantity extracted from the above image data, where the modification includes a magnification or reduction, and is characterized by one or more parameters, is carried out. Further, in the character search means 407, a character represented by an image data, by comparing the characteristic quantity which is extracted from the image data and is processed corresponding to the magnification/reduction of the scale of the above image data, with the characteristic quantities of characters which are memorized in the dictionary, is determined.

According to the third aspect of the present invention, a modification including thickening or thinning of an image data representing a character, where the above modification is characterized by one or more parameters, can be carried out by appropriately setting the parameters in the character image modification means, without modifying characteristic quantities in the dictionary.

In addition, according to the third aspect of the present invention, a modification of the above characteristic quantity which is extracted from the above image data, where the modification is equivalent to a magnification or reduction of the above image data, which magnification or reduction is characterized by one or more parameters, can be carried out by appropriately setting the parameters in the characteristic quantity magnification/reduction means 408, without modifying characteristic quantities in the dictionary.

Thus, In the third aspect of the present invention, owing to the above modification of the characteristic quantity which is extracted from the above image data, where the modification is equivalent to a magnification or reduction of the image data, which magnification or reduction is characterized by one or more parameters, the process for the magnification or reduction is simplified, and a necessary time to carry out the process is reduced. Further, when a characteristic quantity of an oblique image data is processed corresponding to image magnification, deformation does not occur.

In addition to the above, it may be necessary to learn a way to carry out the above thickening or thinning and the above magnification or reduction so as to maximize the recognition rate.

Namely, in the conventional character recognition apparatus, it is necessary for the thickening or thinning process to set a number of operations for thickening or thinning of the above original image by adding or removing a line having a width of one dot, in order to maximize the recognition rate, based on the actually input image data of a character, and it is necessary for the magnification or reduction process to set a magnification rate of the scale to maximize the recognition rate, according to a kind of the actually input character.

Figure 10:
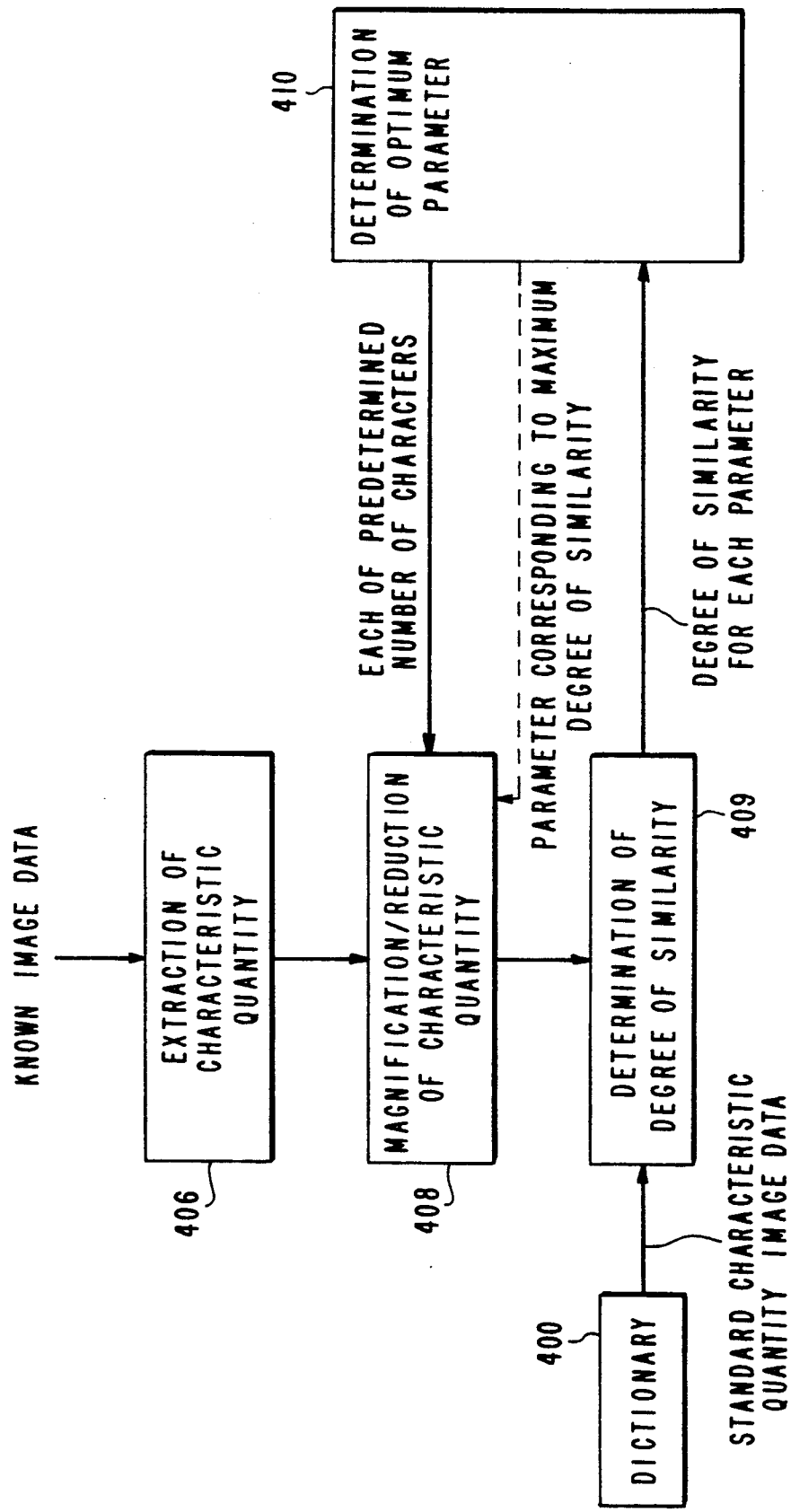
FIGS. 10 and 11 show an outlined construction of the fourth aspect of the present invention.
Figure 11:
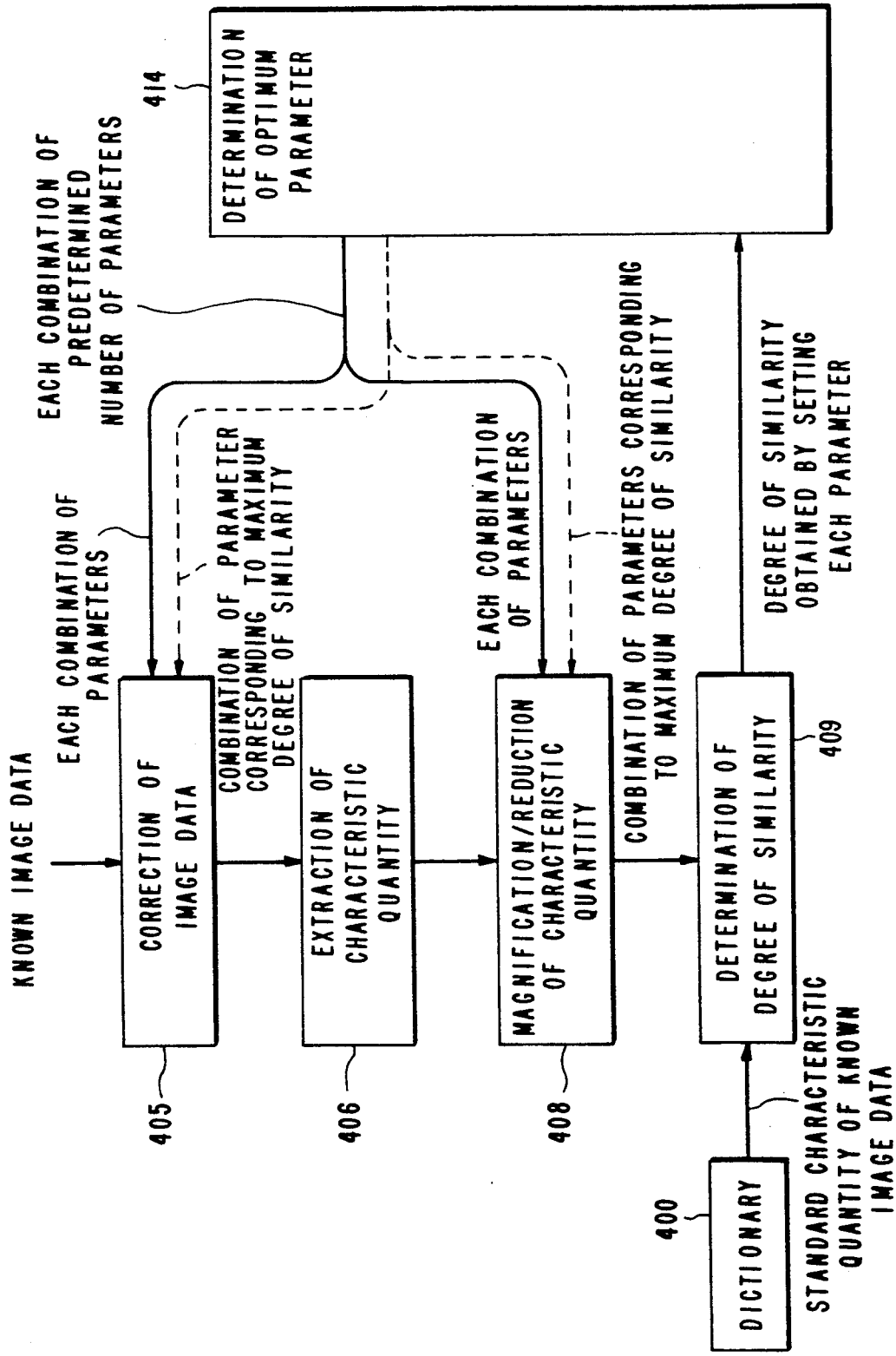

The fourth aspect of the present invention is provided for solving the above problem. as described before under the subheading "SUMMARY OF THE INVENTION", in the fourth aspect of the present invention, the operation of which is carried out together with either of the operations of the above first to third aspects of the present invention, the above magnification or reduction of the scale in the above characteristic quantity magnification/reduction means is characterized by one or more parameters which corresponds to the magnification or reduction [as shown in FIGS. 10 and 11 respectively for the second and third aspects of the present invention (although it is not shown for the first aspect of the present invention, it will be easily understood from FIGS. 10 and 11)]. Further, after the operations of the above first to third aspects of the present invention, an optimum parameter is obtained by carrying out a modification of a characteristic quantity which is extracted from a known image data, where the modification corresponds to the magnification or reduction of the scale using each of a predetermined number of parameters, and then comparing the modified characteristic quantity with a characteristic quantity which is memorized in the dictionary and corresponds to the above known image data.

It is usually unnecessary to carry out the above operation for setting an optimum parameter every time a new character image data is input, when the same kind of characters are successively input. However, the kind of characters, in particular, scales or widths of characters may change in a document.

Figure 12:
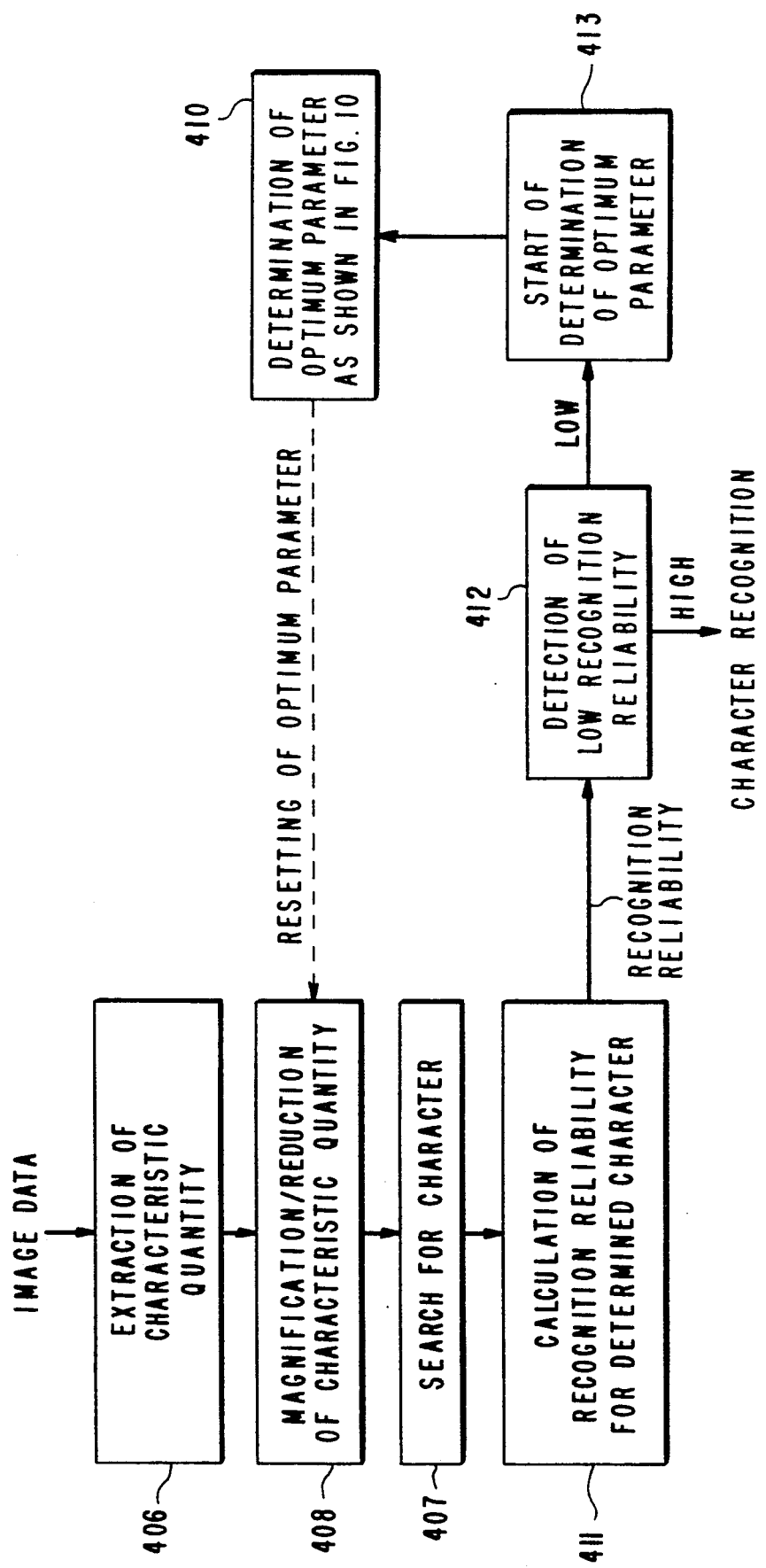
FIGS. 12 and 13 show an outlined construction of the fifth aspect of the present invention.
Figure 13:
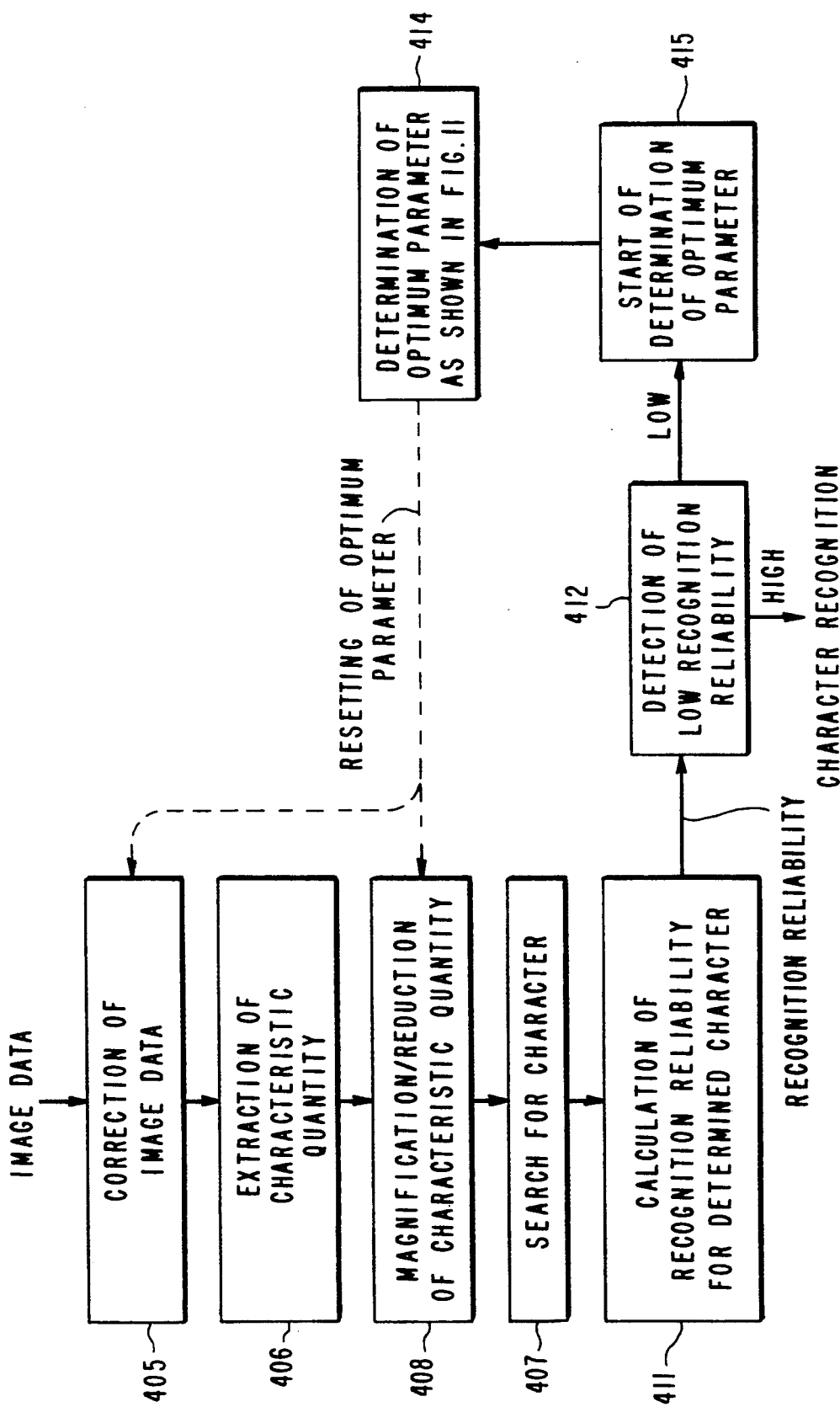

The fifth aspect of the present invention is advantageous to the above situation wherein the kind of characters, in particular, scales or widths of characters may change in a document. In the fifth aspect of the present invention, as described before under the subheading "SUMMARY OF THE INVENTION", the above comparison in the above character search means is carried out by obtaining values which indicate degrees of similarity between the above characteristic quantity extracted from the above image data and respective characteristic quantities memorized in the above dictionary (by the means for determining degree of similarity in FIGS. 10 and 11); the above determination of the character in the above character search means is carried out by obtaining a character which has the highest similarity among the characters in the dictionary based on the above values [as shown in FIGS. 12 and 13 respectively for the second and third aspects of the present invention (although it is not shown for the first aspect of the present invention, it will be easily understood from FIGS. 12 and 13)], and then, in the low degree of similarity determining means 412, it is determined whether or not a degree of similarity of a determined character is equal to or below a first threshold value. Next, in the optimum parameter determination starting means 413, an optimum parameter is obtained by restarting the aforementioned optimum parameter determining means when the degree of similarity of the determined character is equal to or below a first threshold value.

Thus, if it is determined necessary (it is determined that the degree of similarity (recognition reliability) is not enough by the currently set parameter) based on the above degree of similarity, an optimum parameter (or an optimum combination of parameters when a plurality of steps exist for modification each characterized by a parameter) among a predetermined plurality of parameters, is determined based on a criteria that the degree of similarity (recognition reliability) with regard to a known character image is highest. Therefore, the optimum parameter determination starting means 413 operates only when the degree of similarity (recognition reliability) is lowered due to changes of the kind of characters, in particular, changes of scales or widths of characters in a document.

Figure 14:
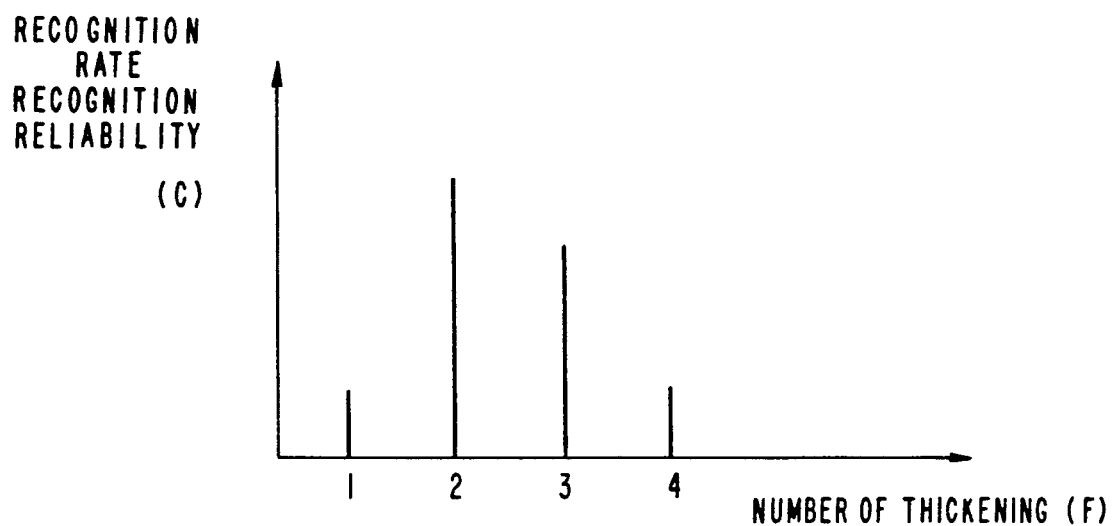
FIGS. 14 and 15 show an example of relationship between a recognition rate (recognition reliability) and a thickening/thinning parameter, and an example of relationship between a recognition rate (recognition reliability) and a magnification/reduction parameter, respectively.
Figure 15:
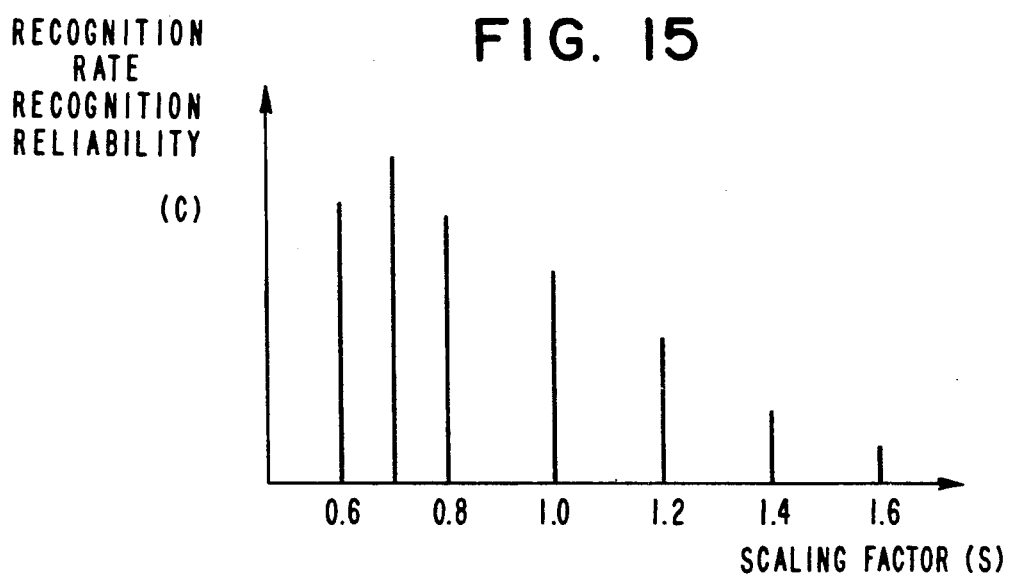

FIGS. 14 and 15 show an example of the relationship between a recognition rate (recognition reliability) and a thickening/thinning parameter, and an example of the relationship between a recognition rate (recognition reliability) and a magnification/reduction parameter, respectively.

FIG. 14 shows a number of operations for thickening or thinning of an original image by adding or removing a line having a width of one dot in order to maximize the recognition rate, and FIG. 15 shows a magnification rate of the scale to maximize the recognition rate. Thus, it is understood that a certain value of the parameter gives the maximum recognition rate.

The sixth aspect of the present invention is provided to solve the aforementioned problem in the prior art, that a small deformation in an input image data due to a slippage of a position of the image data or a variation of concentration or a blur, is recognized as a characteristic feature of a character, and causes a degradation of a recognition rate. In the sixth aspect of the present invention, the operation of which is carried out together with either of the operations of the first to fifth aspects of the present invention, as described before under the subheading "SUMMARY OF THE INVENTION", the aforementioned characteristic quantity is expressed by a vector quantity comprised of a plurality of components, and the above values which quantitatively indicate degrees of similarity is a function of an absolute value of differences between respective corresponding components of the vectors of the above characteristic quantity extracted from the above image data and the characteristic quantities memorized in the above dictionary. Further, in the small difference determining means, it is determined whether or not each of the above absolute values of differences between the above corresponding components, is equal to or below a second threshold value, in the aforementioned comparison. Then, in the error accumulation preventing means, each absolute value which is equal to or below the above second threshold value, among the absolute values of differences between the above corresponding components, is made zero, before the aforementioned operation of obtaining the above values which indicate degrees of similarity.

Thus, according to the sixth aspect of the present invention, the above erroneous recognition due to the small deformation is prevented, and the recognition rate is not lowered.

The seventh embodiment of the present invention is advantageous for effectively detecting a position of the erroneous recognition.

In the seventh embodiment of the present invention, the operation of which is carried out together with the operations of either of the first to sixth aspects of the present invention, as described before under the subheading "SUMMARY OF THE INVENTION", the aforementioned comparison in the character search means is carried out by obtaining values which indicate degrees of similarity between the characteristic quantity extracted from the image data and respective characteristic quantities memorized in the dictionary, and the aforementioned determination of the character in the character search means is carried out by obtaining a character which has the highest similarity among the characters in the dictionary based on the above values. Further, in the erroneous recognition character determining means, it is determined whether or not the determined degree of similarity is equal to or below a third threshold value when each character is determined. Then, in the erroneous recognition character indicating means, it is indicated that the above character is determined based on an erroneous recognition, when the determined degree of similarity is equal to or below the third threshold value.

According to the seventh embodiment of the present invention, characters having a recognition reliability lower than a predetermined (third) threshold value, are automatically indicated, and therefore, the operation for detecting an erroneously recognized character, can be efficiently carried out.

The eighth embodiment of the present invention is advantageous for an operator to enable an efficient operation for referring to a position corresponding to the above erroneous recognition in the input image data.

In the eighth embodiment of the present invention, as described before under the subheading "SUMMARY OF THE INVENTION", comprising the same construction as the operations of either of the first to seventh aspects of the present invention, and further, in the character region extracting means, a character region indicating an individual character is extracted from the above image data, and then in the character search means, the character represented by the image data, is determined by comparing the characteristic quantity which is extracted from the image data, with the characteristic quantities of characters which are memorized in the dictionary. In the text displaying means, the above determined characters is displayed on a display apparatus in the order that the corresponding character regions are located in the above image data. Further, the text image coordinate-corresponding memorizing means is provided, and thereby the coordinate of each character for displaying the character on the above display apparatus by the above text displaying means, is memorized with a correspondence to a coordinate of a corresponding character region in the original image data.

According to the eighth embodiment of the present invention, when the operator detects an erroneously recognized character, the operator can obtain a coordinate of the image data corresponding to the erroneously recognized character, which is memorized in the text image coordinate-corresponding memorizing means, by designating the coordinate of the erroneously recognized character on the text display, and therefore, the operation for referring to a position corresponding to the above erroneous recognition in the input image data, can be efficiently carried out.

Figure 1:
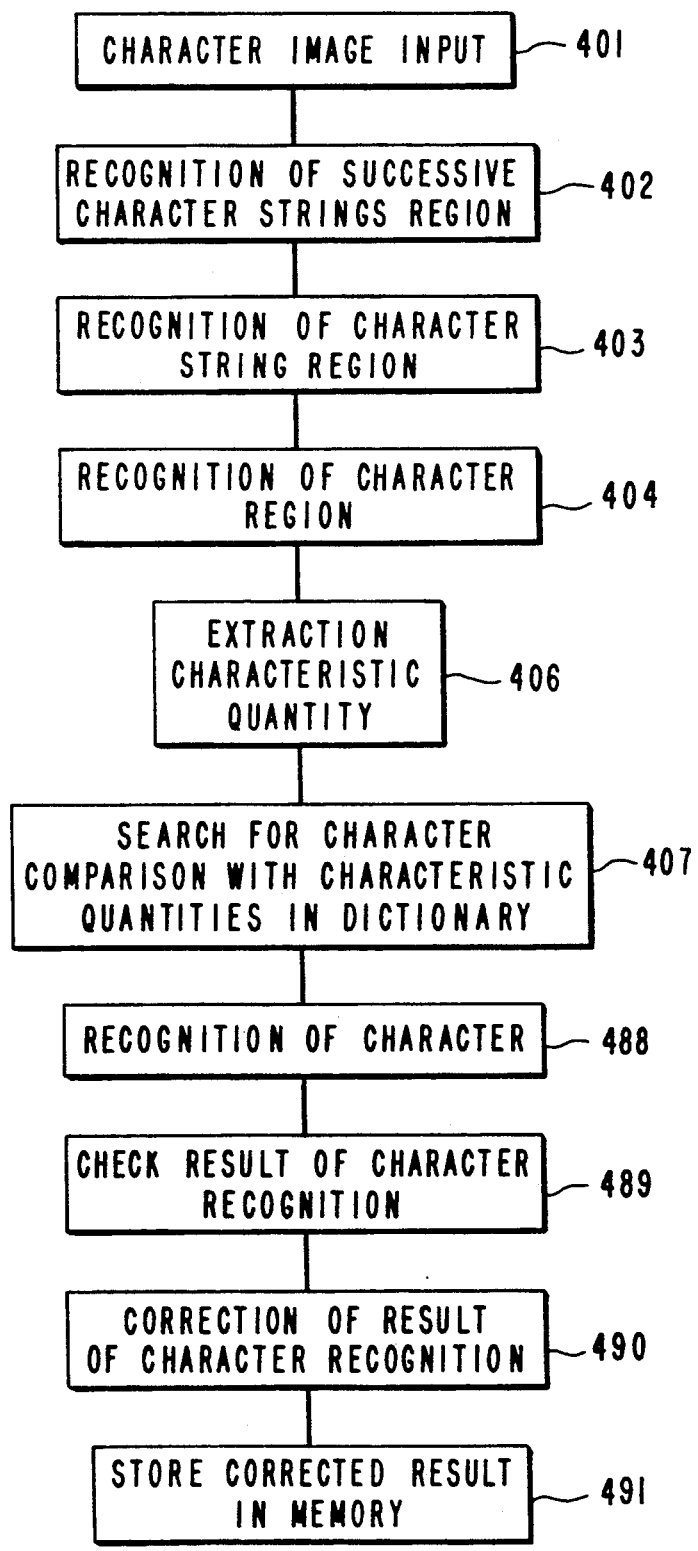
FIG. 1 shows a main process in the conventional character recognition apparatus.
Figure 2:
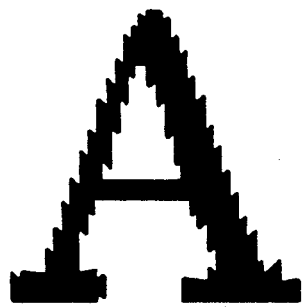
Figure 3:
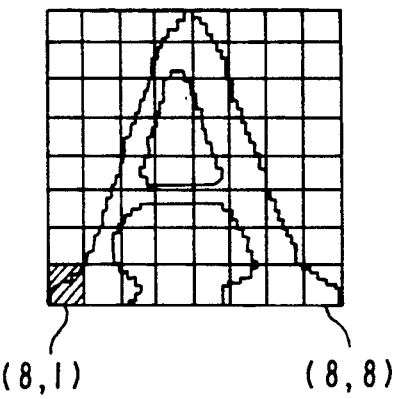
Figure 4:
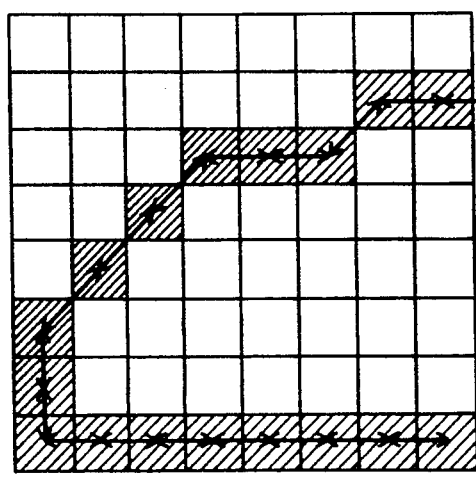

The ninth aspect of the present invention is advantageous to solve the problem that in the process in the conventional character recognition apparatus shown in FIG. 1, when a region wherein successive character strings, i.e., a region wherein sentences are printed, is extracted from other regions of a continuous image such as a picture, a drawing, or the like, in the step 402, an amount of data which is processed is large, a large size of hardware and a long processing time are necessary, and the ninth aspect of the present invention is also advantageous to obtain a high processing speed and a high resolution at the same time.

Figure 16:
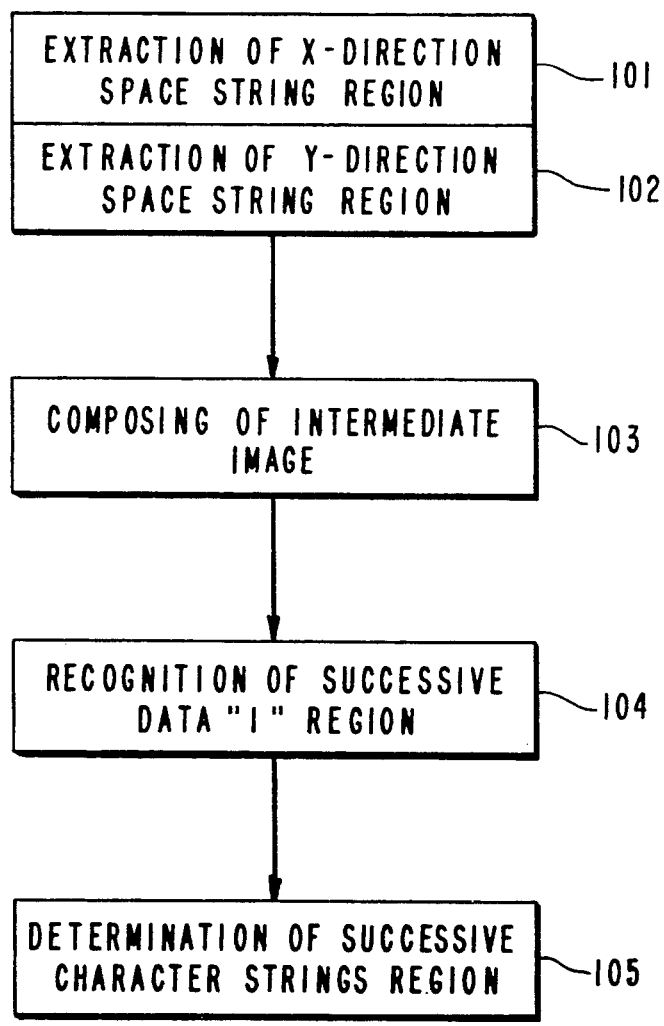
FIG. 16 shows an outlined construction of the ninth aspect of the present invention.

In the fifth aspect of the present invention, the operation of which is carried out together with the operations of either of the second to eighth aspects of the present invention, as described before under the subheading "SUMMARY OF THE INVENTION", in the successive character strings region recognizing means, a successive character strings region including successive character strings is recognized in an image of a document which is comprised of a character strings region including successive character strings which are printed at intervals within a predetermined range, and a continuous image region. Then, in the character string region recognizing means, each character string is recognized in the above successive character strings region, and then, in the character region recognizing means, each character region indicating an individual character is recognized from the above image data. In the characteristic quantity extracting means, a characteristic quantity is extracted from the image data in the above character region, and in the character search means, a character represented by an image data, is determined by comparing the characteristic quantity which is extracted from the image data, with the characteristic quantities of characters which are memorized in the dictionary. Further, in the above successive character string region recognizing means, as shown in FIG. 16, the successive character string region is recognized in the following procedure.

First, in the X-direction /Y-direction space string region extracting means 101, 102, a string region consisting of successive spaces (0 data) extending over a predetermined width and over a predetermined length, is extracted in each of the X and Y directions. In the intermediate image composing means 103, a logical multiplication of an X-direction intermediate image and a Y-direction intermediate image are composed, where all data in the above X-direction space string region is "zero" and all other data is "one" in the above X-direction intermediate image, and all data in the above Y-direction space string region is "zero" and all other data is "one" in the above Y-direction intermediate image. In the successive data "one" region recognizing means 104, a successive data "one" region in an image which is obtained by the above composing operation, is recognized in a manner that a label is assigned to each group of successive string regions in the image obtained by the above composing operation, where each string region in the group contains data "one" only, extends over a predetermined width and over a predetermined length in the X-direction or the Y-direction, and is located adjacent to the other string region in the group. Further, in the character string region determining means 105, a part of the original image data corresponding to a projected image is determined as a character string region when the width of the projected image is equal to or less than a predetermined width, where the above projected image is obtained by projecting the original image data in the direction of the character string in a region of the original image corresponding to the above successive data "one" region.

In particular, in the procedure of the above character string region recognizing means, the label assignment (labeling) for data which belong to the same successive data "one" region is carried out for each line segment. Thus, the process of the labeling is simplified compared with the conventional dot-by-dot labeling process, and therefore, the size of hardware is made small, and the processing time is reduced.

The above are general matters in various aspects of the present invention.

In the following, embodiments of the above in various aspects of the present invention, are explained.

Figure 17:
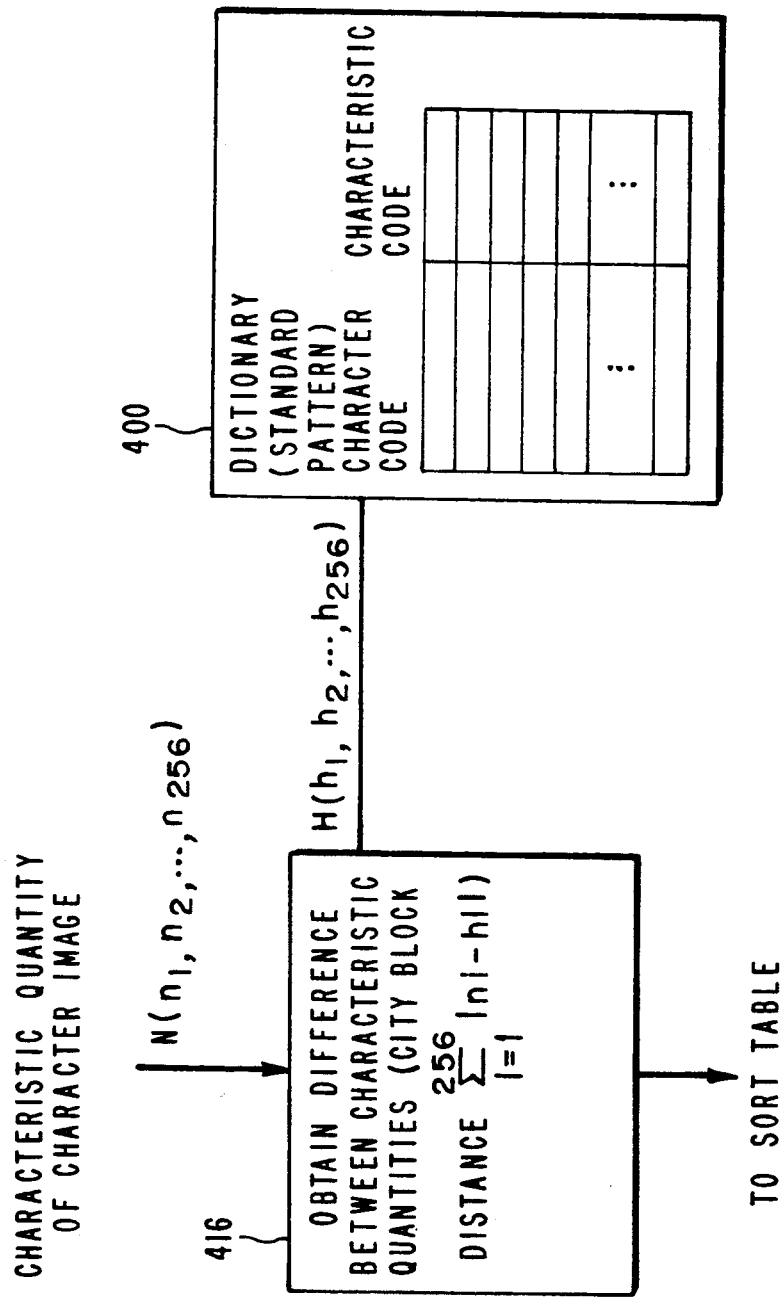
FIG. 17 shows an example of a way to obtain a degree of similarity.

FIG. 17 shows an example of way to obtain the aforementioned degree of similarity, in particular, where the value which indicates the degree of similarity, is a function of absolute values of differences between respective corresponding components of the (256-dimensional) vector $N=(n_1, n_2, \ldots n_{256})$ of the characteristic quantity extracted from the above image data and a vector $H=(h_1, h_2, \ldots h_{256})$ of a characteristic quantity memorized in the above dictionary.

In the example of FIG. 17, the above degree of similarity is defined as a reciprocal number of a called city block distance. The city block distance is defined by $$\sum_{i=1}^{256} |n_i - h_i|.$$

(Generally, the above degree of similarity can be defined as an arbitrary function of $|n_i - h_i|$.)

The dictionary provided in the character recognition apparatus memorizes characteristic quantities of a plurality of standard patterns of characters $H=(h_1, h_2, \ldots h_{256})$ with corresponding character codes (In FIGS. 18 and 19, "H" denotes that the number is a hexadecimal number.). Then, the city block distances are calculated between the above (256-dimensional) vector $N=(n_i, n_2, \ldots n_{256})$ of the characteristic quantity extracted from the above image data and the characteristic quantities of a plurality of standard patterns of characters $H=(h_1, h_2, \ldots h_{256})$, by software or a hardware logic circuit, as shown for Chinese characters in FIG. 18 (same for alphabet), so that the function of the aforementioned character search means is realized.

By the above character search means, first, as shown in FIG. 19, corresponding to the above (256-dimensional) vector $N=(n_1, n_2, \ldots n_{256})$ of the characteristic quantity extracted from the above image data, a sort table is generated wherein character codes are arranged in the higher to lower order of degree of similarity.

Figure 20:
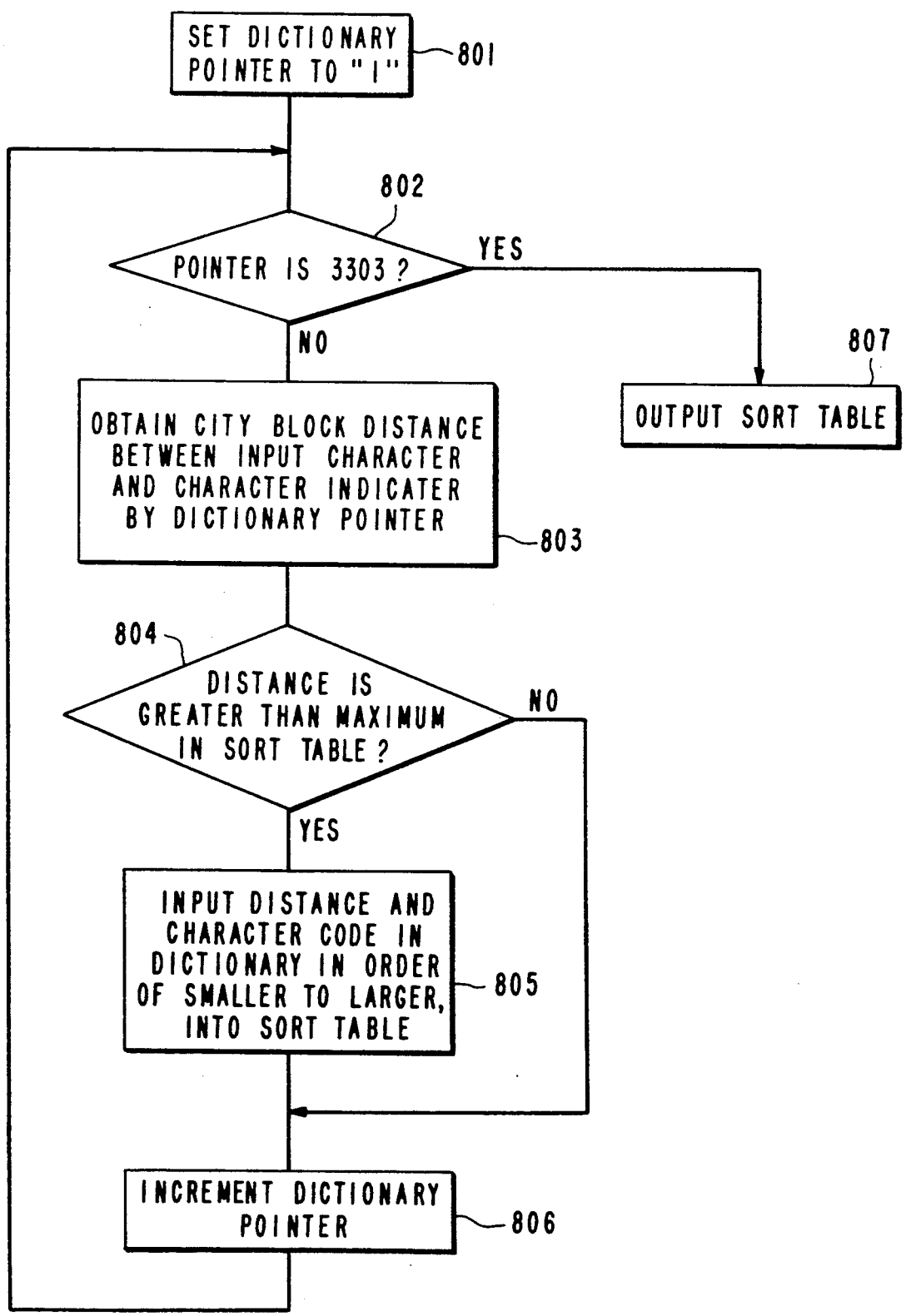
FIG. 20 shows a process for making a sort table.

The procedure of generating a sort table is shown in FIG. 20.

In the step 801 of FIG. 20, a pointer of the dictionary is set to "1".

In the step 802, it is determined whether or not the dictionary pointer points to a maximum (3303 in the example of FIG. 20).

If it is determined the dictionary pointer does not point to a maximum, the operation goes to the step 803, and the city block distance between the characteristic quantity extracted from the input character image data, and the standard characteristic quantity of the character which the above dictionary pointer points to.

In the step 804, it is determined whether or not the above city block distance is larger than the maximum of the city block distances of the character codes which have been written in the sort table.

If it is determined larger, the operation goes to the step 806, or if it is determined not larger, the operation goes to the step 805.

In the step 805, the city block distances (or degree of similarities) and the corresponding character codes in the dictionary, are written in the sort table in the smaller order of the city block distances.

In the step 806, the dictionary pointer is incremented, and the operation goes to the step 802.

If it is determined that the dictionary pointer points to the maximum, the operation goes to the step 807, and a sort table is output.

Figure 21:
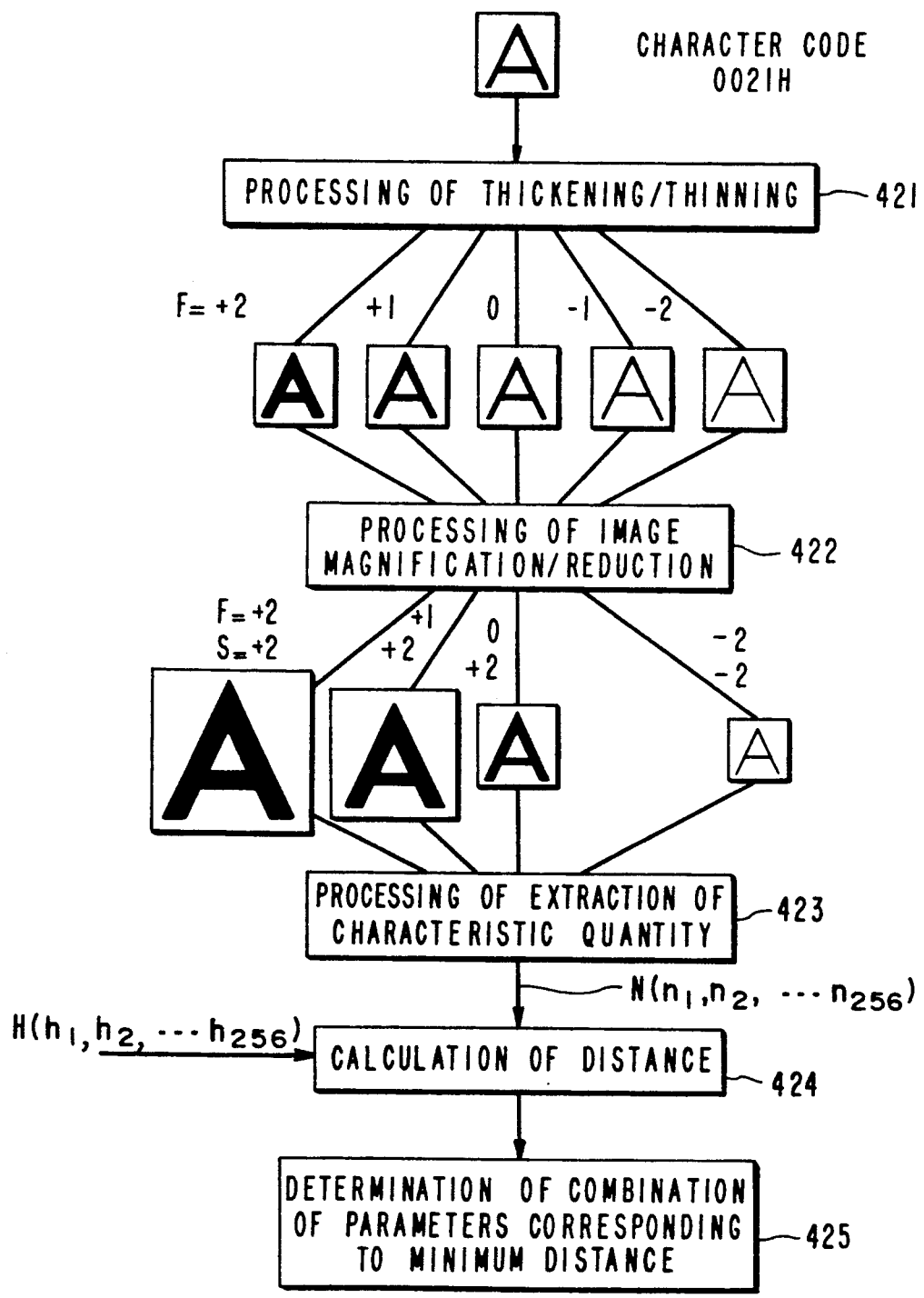
FIG. 21 shows an example of a process for determining an optimum parameter.

FIG. 21 shows an example of procedure for determining optimum parameters.

FIG. 21 corresponds to the aforementioned first aspect of the present invention, and similar procedures are used for determining optimum parameters for the second and third aspects of the present invention which are shown in FIGS. 10 and 11.

In the procedure of FIG. 21, five parameters $F=+2, +1, 0, -1$, and $-2$ are predetermined for the thickening/thinning operation in the aforementioned character image modification means, and further five parameters $S=+2, +1, 0, -1$, and $-2$ are predetermined for the magnification/reduction operation in the aforementioned character image modification means.

Thus, the following operation is carried out for each of the twenty five ($5 \times 5=25$) combinations of parameters for thickening/thinning and magnification/reduction. Namely, a thickening/thinning operation of a known character, for example, "A", for each of the above parameters F (in the step 421), a magnification/reduction operation of the known character for each of the above parameters S (in the step 422), and then an extraction of a characteristic quantity is carried out (in the step 423), and a city block distance between the characteristic quantity and a standard characteristic quantity which is memorized for the character "A" in the dictionary. Thus, a combination of the parameters which gives the smallest city block distance, and this combination of the parameters is set for the above thickening/thinning and magnification/reduction operations, as optimum parameters.

Figure 22B:
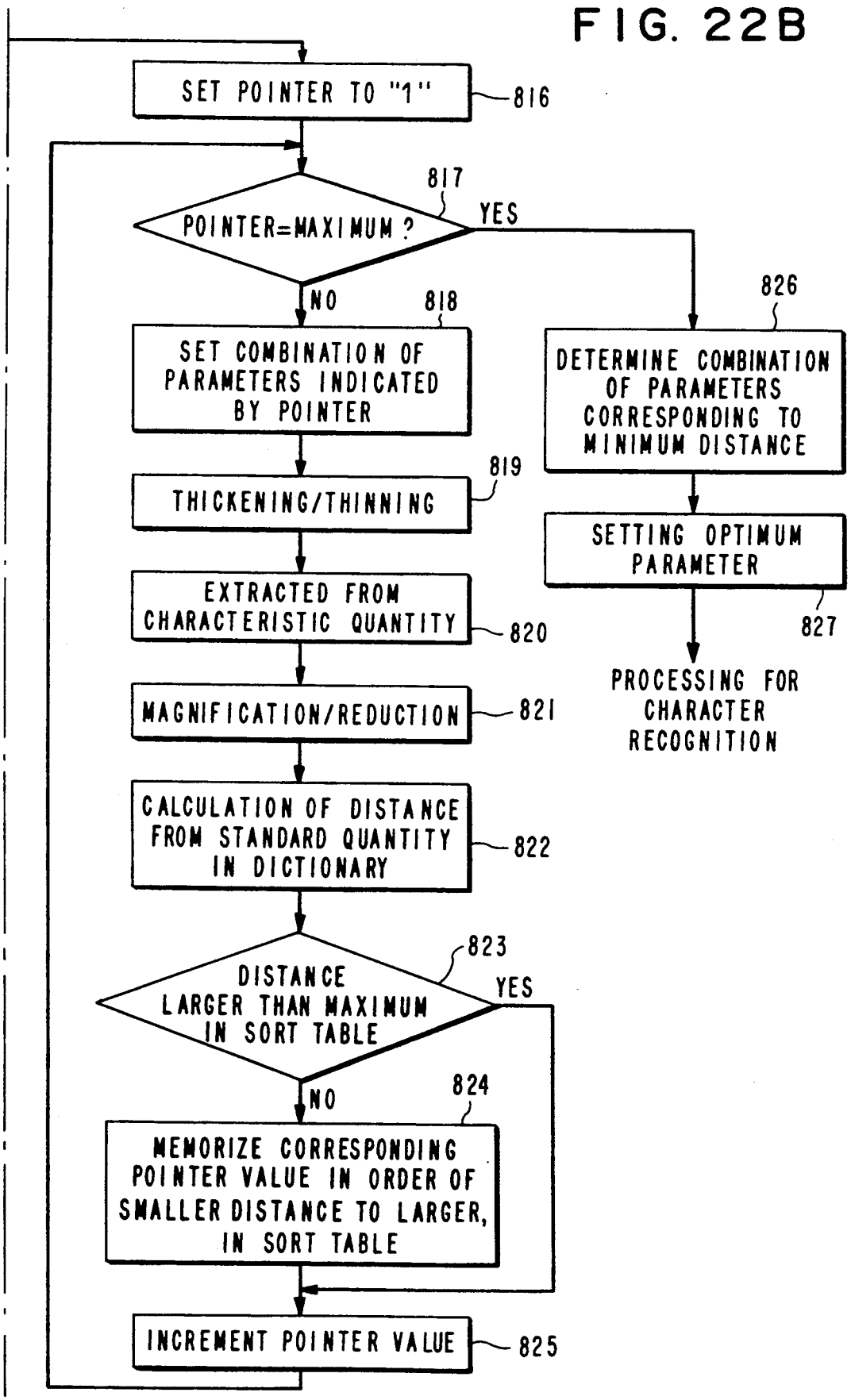

The above procedure for obtaining the combination of the parameters which gives the smallest city block distance, is similar to the procedure for obtaining the sort table in FIG. 20 (The procedure in the steps 816 to 827 of FIG. 22 corresponds to the procedure for obtaining the optimum parameter).

Alternatively, instead of the above step 422 for the magnification/reduction, an operation on the characteristic quantity corresponding to a magnification/reduction may be carried out after the step 423 for extracting a characteristic quantity, as the third aspect of the present invention.

In the characteristic quantities which are obtained in the procedures of FIGS. 2 to 6, the r times of magnification of an image corresponds to a multiplication of a scalar r on the characteristic quantity vector.

FIG. 22 shows a control procedure in the embodiment of the fifth aspect of the present invention.

The process to the steps 815 in FIG. 22, is a procedure of a normal character recognition in accordance with the fifth aspect of the present invention. According to the procedure in FIG. 20, after the sort table is obtained, in the step 811, regarding the character code written in the sort table corresponding to the minimum city block distance, a power of the character $$\sum_{i=1}^{256} |h_i|$$

is obtained. Then, the above minimum city block distance is referred to in the step 812, and a ratio of the above power to the minimum city block distance is calculated as a recognition reliability.

In the step 814, it is determined whether or not the above recognition reliability exceeds a predetermined threshold value. When it is determined that the above recognition reliability exceeds a predetermined threshold value, the character having the minimum city block distance (the maximum degree of similarity), which is obtained through the procedure of FIG. 20, is output as a recognized character in the step 815.

When it is determined that the above recognition reliability does not exceed a predetermined threshold value in the step 814, the operation goes to the step 816, and the pointer is set to "1". The procedure of the step 814 and after corresponds to the aforementioned control procedure of the optimum parameter determination starting means, and is substantially equivalent to the aforementioned control procedure of the optimum parameter determination means.

In the step 817, it is determined whether or not the above pointer points to its maximum (which is equal to the total number of the aforementioned combinations of the parameters). When it is determined that the above pointer does not point to its maximum, the parameters in the combination which the pointer points to, is set in the corresponding processing stage in the step 818.

Then, the thickening/thinning is carried out in the step 819, the characteristic quantity is extracted in the step 820, the characteristic quantity vector is magnified/reduced in the step 821, and the (city block) distance between the characteristic quantity vector which is magnified/reduced, and each of the standard characteristic quantity vectors in the dictionary, is calculated in the step 822.

In the steps 823 to 825 and 816, a sort table wherein pointer values are arranged in the smaller to larger order of the above city block distances, which is similar to the sort table in FIG. 19 (although not shown). Otherwise, if the second candidate for the optimum parameter combination is unnecessary, the sort table may contain only a pointer value which corresponds to a parameter combination giving a minimum city block distance.

Thus, in the step 823, when it is determined that the city block distance which is calculated in the step 822, is not larger than the maximum value held at the time in the sort table, the operation goes to the step 824, and the current pointer value is written in the sort table in the smaller order of the city block distance. The pointer value is incremented in the step 825, and then the operation goes to the step 817.

In the step 823, when it is determined that the city block distance which is calculated in the step 822, is larger than the maximum value held at the time in the sort table, the operation goes to the step 825.

In the step 817, it is determined that the pointer value is equal to the maximum value, which is equal to the total number of the all combinations of the parameters, the operation goes to the step 826, and the combination of the parameters which is written in the sort table, and corresponds to the minimum city block distance, is determined as the optimum combination of the parameters. Then, in the step 827, the parameters in the above optimum combination are set in the corresponding stages of the procedure, and the operation goes back to the normal procedure of the character recognition apparatus.

Figure 23:
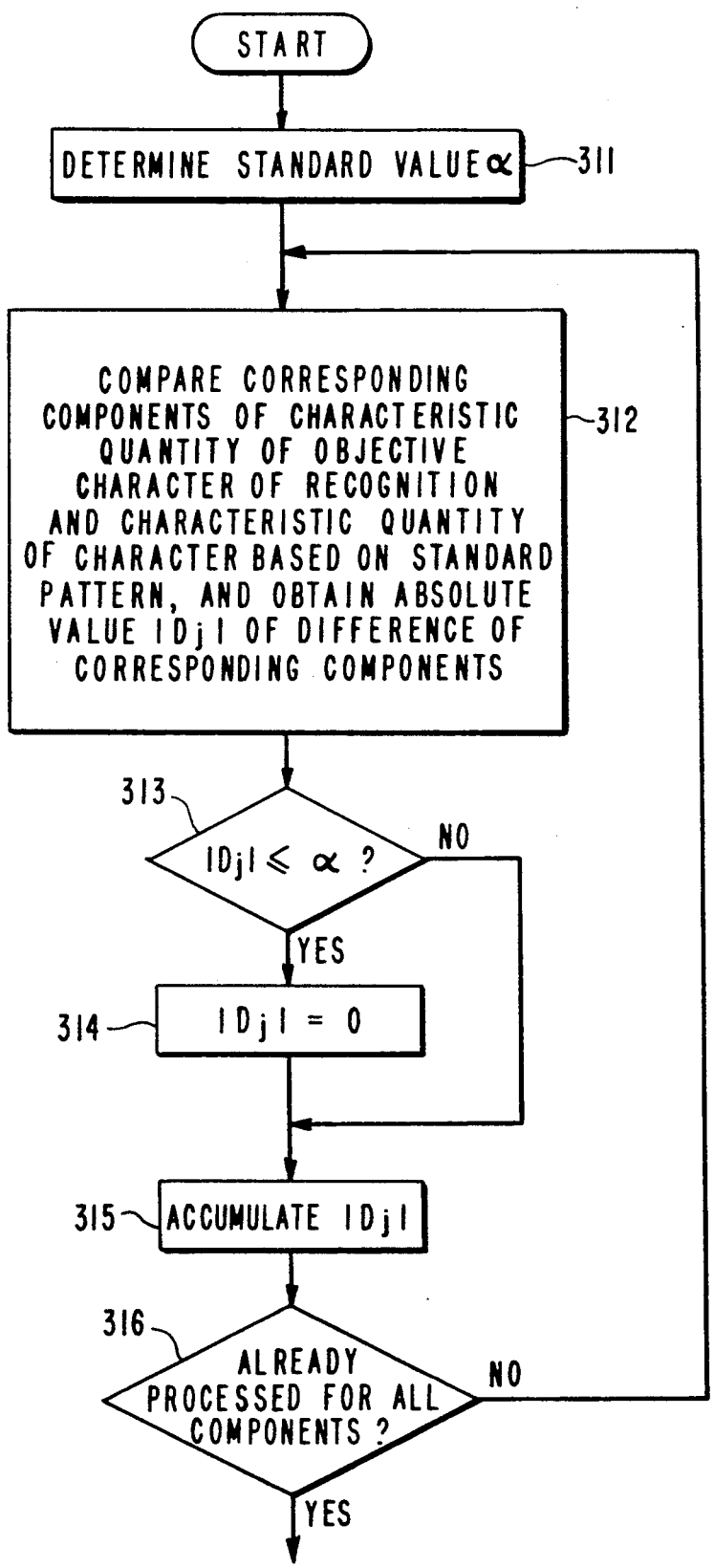
FIG. 23 shows a process in the embodiment of the sixth aspect of the present invention.

FIG. 23 shows the procedure in the embodiment of the sixth aspect of the present invention.

The standard value $\alpha$ which is determined in the step 311 of FIG. 23, corresponds to the aforementioned second threshold value.

The operation in the steps 312 to 316 is a variation of the operation in the step for comparing the characteristic quantity vector of the character image data with the standard characteristic quantity vectors in the dictionary (the step for obtaining the city block distance) in the aforementioned character search means.

In the step 312, absolute values $|D_j| = |n_j - h_j|$ $(j=1-256)$ of differences between respective corresponding components of the characteristic quantity vector $N=(n_1, n_2, \ldots n_{256})$ of the image data and the standard patterns of a plurality of characters in the dictionary, is obtained.

In the step 313, it is determined whether or not the above $|D_j|$ is equal to or smaller than the above standard value $\alpha$. When it is determined that the above $|D_j|$ is equal to or smaller than the above standard value $\alpha$, The difference of the components $|D_j|$ is made zero in the step 314, or when it is determined that the above $|D_j|$ is not equal to nor smaller than the above standard value $\alpha$, the step 314 is skipped and the difference of the components $|D_j|$ is accumulated in the step 315.

In the step 316, it is determined whether or not the accumulation has been carried out for all the components (i.e., it is determined whether or not $j=256$), and the accumulation is carried out until $j=256$, and thus, the city block distance is obtained.

Thus, using the above city block distance, a sort table is generated in accordance with the aforementioned procedure of FIG. 19, and the character code corresponding to the minimum city block distance is obtained.

This embodiment is explained using concrete numerical values in the followings. For explanation, each characteristic quantity vectors are each assumed to a five dimensional vector.

Assume that The characteristic quantity N which is to be recognized, and the characteristic quantity H based on a standard pattern, are respectively $N=(2, 1, 3, 2, 5)$ and
$H=(1, 2, 3, 4, 5)$.

In the conventional method, the differences between the characteristic quantities are $|2-1|$, $|1-2|$, $|3-3|$, $|2-4|$, $|5-5|$, and thus the city block distance is $$|2-1|+|1-2|+|3-3|+|2-4|+|5-5|=1+1+0+2+0=4.$$

When the standard value $\alpha$ is set $\alpha=2$ according to the present invention, the city block distance is made $$|2-1|+|1-2|+|3-3|+|2-4|+|5-5|\rightarrow 0+0+0+2+0=2.$$

As explained above, the accumulation is carried out only for the differences between the components of the characteristic quantity of the character which is to be recognized and the characteristic quantities based on the standard patterns of the characters, each of which differences is equal to or larger than the predetermined value (the standard value $\alpha$), and therefore, the small slippage or deformation of the character which is to be recognized from the standard patterns in the dictionary, can be absorbed. Therefore, the small slippage or deformation of the character which is to be recognized, does not affect the accumulated value, and the recognition rate can be improved.

If the above standard value $\alpha$ is too large, discrimination from other similar characters may be difficult. The appropriate standard value $\alpha$ is, for example, 2 for symbols, 3 for Japanese kana characters, and 4 to 5 for Chinese characters, when the resolution is 300 dpi and the size is 10.5 points.

Otherwise, the above accumulation procedure of simply accumulating the absolute values of differences of the components, may be replaced by a procedure of accumulating the square or the third power of the absolute values of differences of the components (in the the above-mentioned example of numerical values, the accumulated values of the square and the third power are respectively 4 and 8), or a procedure of accumulating the values $(|D_j|-\alpha)$ for the absolute values $|D_J|$, which are equal to or larger than the standard value $\alpha$ (in the the above-mentioned example of numerical values, the accumulated value is zero).

Figure 24:
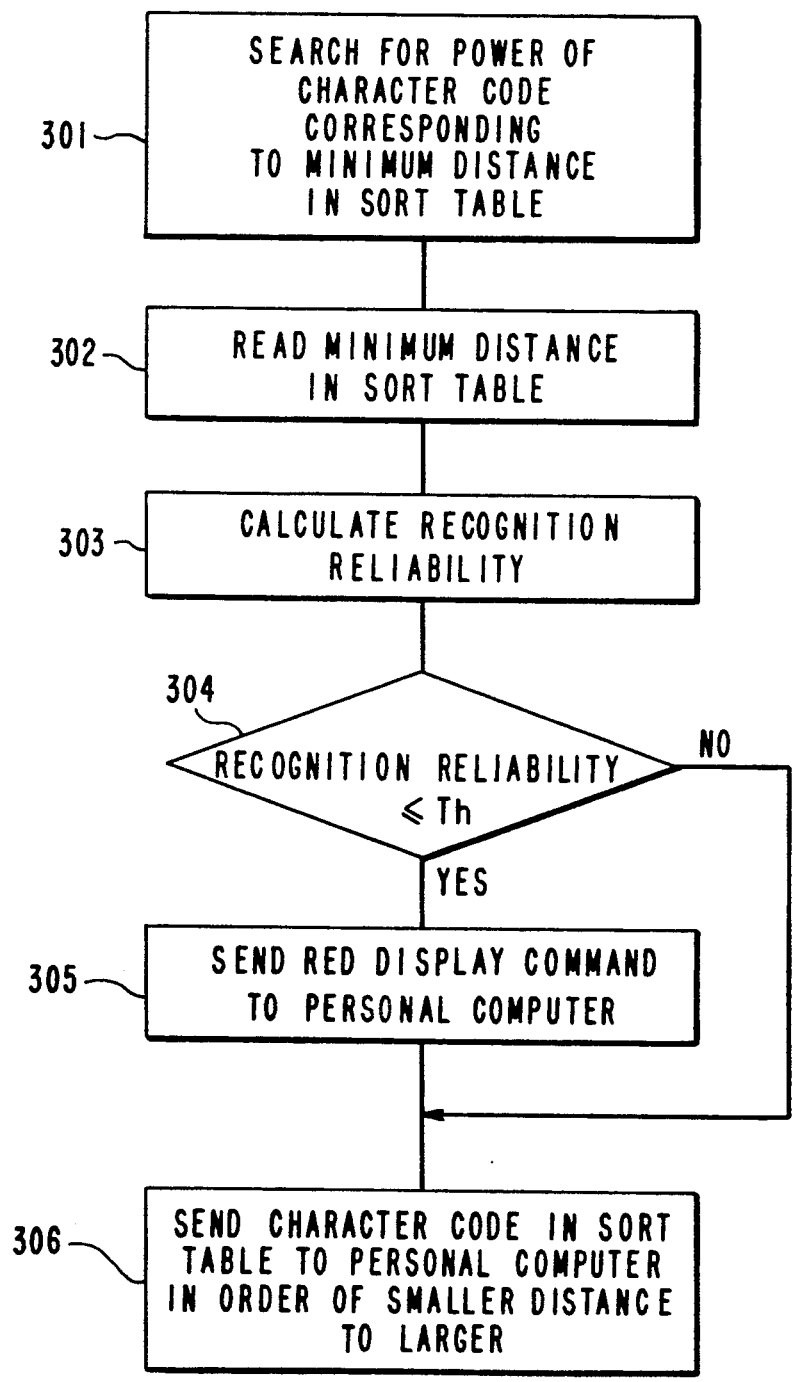
FIG. 24 shows a process in the embodiment of the seventh aspect of the present invention.

FIG. 24 shows a procedure in software which realizes the erroneous recognition character determining means and the erroneous recognition character indicating means in the seventh aspect of the present invention.

In the step 301 of FIG. 24, a power of the character code corresponding to the minimum city block distance in the sort table which is obtained in the procedure of FIG. 20 (one of the powers of the standard characteristic quantity vectors which are memorized in the dictionary), is searched for.

In the step 302, the above minimum city block distance in the sort table is referred to, and in the step 303, the recognition reliability is calculated in accordance with the aforementioned definition, (recognition reliability)=(power)/(city block distance).

In the step 304, when the recognition reliability is equal to or smaller than a value Th which corresponds to the aforementioned third threshold value, a command for indicating an inaccurate recognition is sent out to a display device which is mentioned later (for example, an instruction to indicate the inaccurate recognized character by red in text displayed on the CRT display device in a personal computer, is sent out). Then, in the step 306, a sort table corresponding to the inaccurate recognized character (for example, the sort table of FIG. 19) is sent to the personal computer.

In the step 304, when the recognition reliability exceeds the value Th which corresponds to the aforementioned third threshold value, the command of the step 305 is not sent out, and the operation of the step 306 is carried out.

Thus, the operator can easily distinguish the character of the low recognition reliability in the text display, by the red text indication at the personal computer.

Then, when an inaccurate recognized character is found, the operator can select a correct one among the second or third or following candidates in the sort table (having the second highest, third highest, or lower degrees of similarity).

Figure 25:
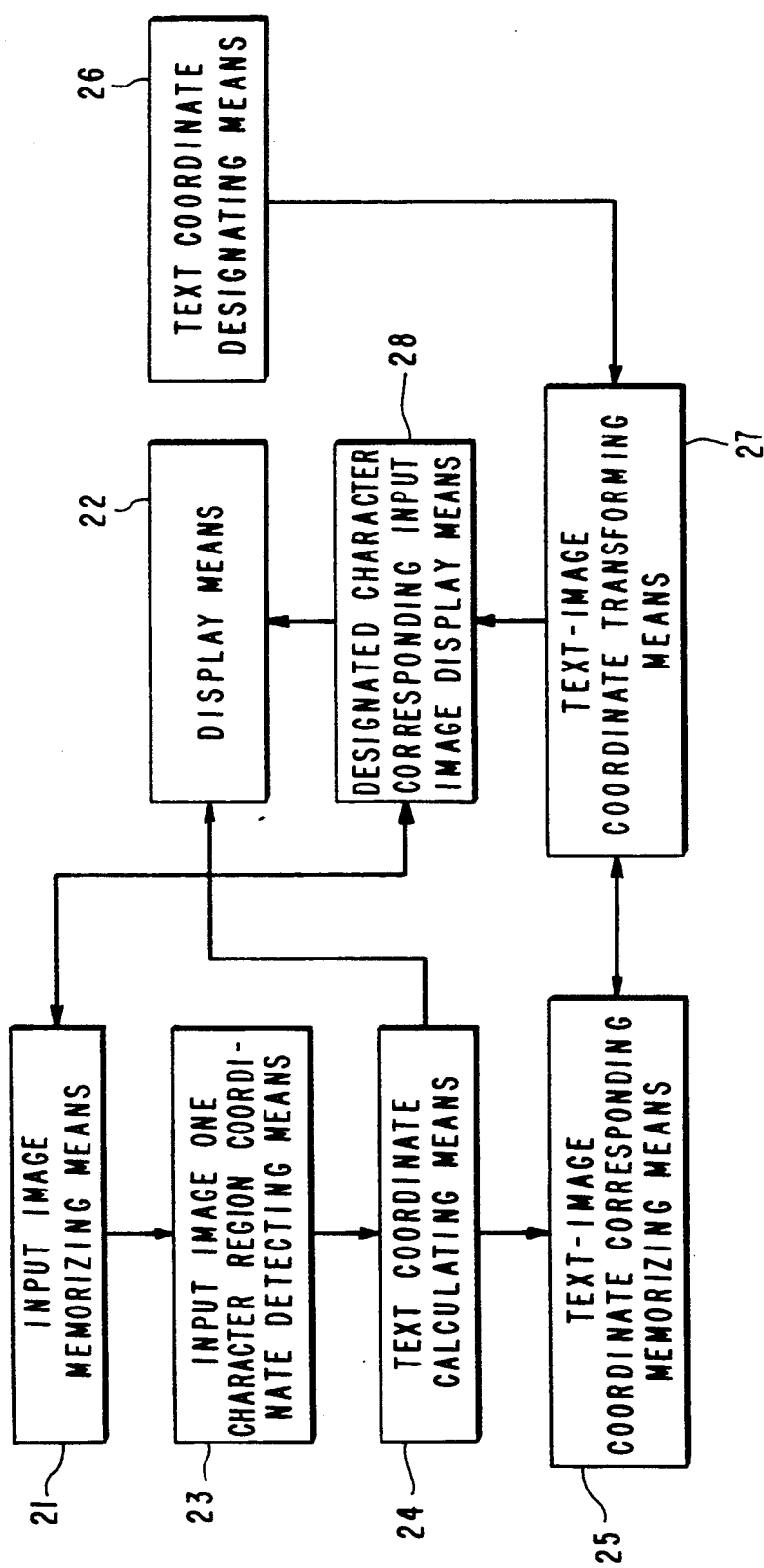
FIG. 25 shows a process in the embodiment of the eighth aspect of the present invention.

FIG. 25 shows a basic construction of the embodiment of the eighth aspect of the present invention. In FIG. 25, 21 denotes an input image memorizing means, 22 denotes a display means, 23 denotes an input image one character region coordinate determining means, 24 denotes a text coordinate calculating means, 25 denotes a text image coordinate-corresponding memorizing means, 26 denotes a text coordinate designating means, 27 denotes a text-image coordinate transforming means, and 28 denotes a designated character corresponding input image display means.

The input image memorizing means 21 memorizes the input image.

The display means 22 displays a character string which is read (recognized) from the input image.

The input image one character region coordinate determining means 23 determines the coordinates of the regions where the respective characters locate in the input image.

The text coordinate calculating means 24 calculates display coordinates for displaying the respective characters which are read from the input image, in the display means 21.

The text image coordinate-corresponding memorizing means 25 is provided corresponding to the text image coordinate-corresponding memorizing means in the eighth aspect of the present invention, and memorizes the coordinates of the respective characters for displaying the characters on the above display means, with correspondence to coordinates of corresponding character regions in the original image data.

The text coordinate designating means 26 designates a display coordinate of any one of the characters displayed on the display means 21.

The text-image coordinate transforming means 27 transforms the display coordinate of the designated character into a coordinate of the corresponding region in the input image.

The designated character corresponding input image display means 28 reads the input image in the region of the coordinate which is transformed in the text-image coordinate transforming means 27, and displays the input image of the region, on the display means 22.

The coordinates of the regions wherein the respective characters are located in the input image, are detected by the input image one character region coordinate determining means 23, and then, the display coordinates for displaying the respective characters which are read from the input image, in the display means 21, are calculated in the text coordinate calculating means 24. Next, the coordinates of the respective characters for displaying the characters on the above display means, are memorized with correspondence to coordinates of corresponding character regions in the original image data, in the text image coordinate-corresponding memorizing means 25.

When the operator scans character string which is read (recognized) from the input image, and finds an abnormal portion which is grammatically incorrect or unnatural in the context, the operator designates the display coordinate of a recognized character which seems to cause the above abnormality, by the text coordinate designating means 26.

The display coordinate of the designated character is transformed into the coordinate of the corresponding region in the input image, by the text-.image coordinate transforming means 27. Then, the input image in the region of the coordinate which is transformed in the text-image coordinate transforming means 27, is read and displayed on the display means 22 by the designated character corresponding input image display means 28.

Thus, the operator can see the input image corresponding to the above recognized character which seems to cause the above abnormality, at the same time as the above display of the recognized character string, on the display means 22, and therefore, a determination whether or not the recognized character is correct, can be efficiently carried out.

Further, since the data processed in the above procedure, are the text coordinates of a character which are designated by the text coordinate designating means 26, the region coordinates of the input image which are obtained through the transformation from the text coordinates, and the input image data in the region, i.e., a large amount of data as in scrolling the display picture is not transformed, the size of hardware or software is not increased, and the processing speed is not lowered.

Figure 26:
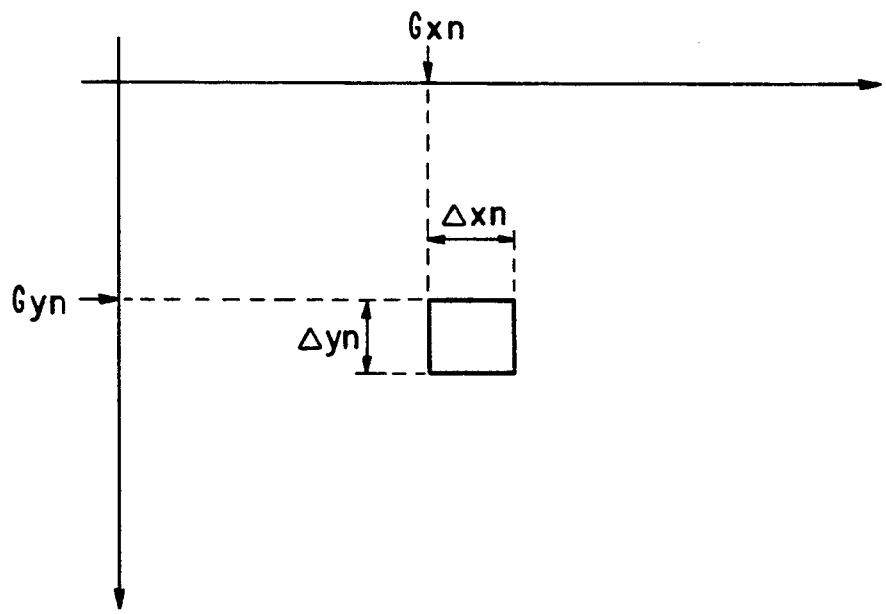
FIG. 26 shows a coordinate of one character region in a plane of an input image data.

FIG. 26 shows an example of a procedure for setting the coordinates of a region of a character (one character region) which is cut out from a graphic picture, i.e., an input image, in the embodiment of the present invention.

The one character region is expressed by a coordinate $G_n=(G_{xn}, F_{yn}, \Delta_{xn}, \Delta_{yn})$, where n is an index which is attached in an order for distinguishing each character, $G_{xn}$ and $G_{yn}$ are respectively X and Y coordinates of the one character region in the field of the input image, and $\Delta_{xn}$ and $\Delta_{yn}$ are respectively a width of the one character region in the X and Y directions in the field of the input image.

Figure 27:
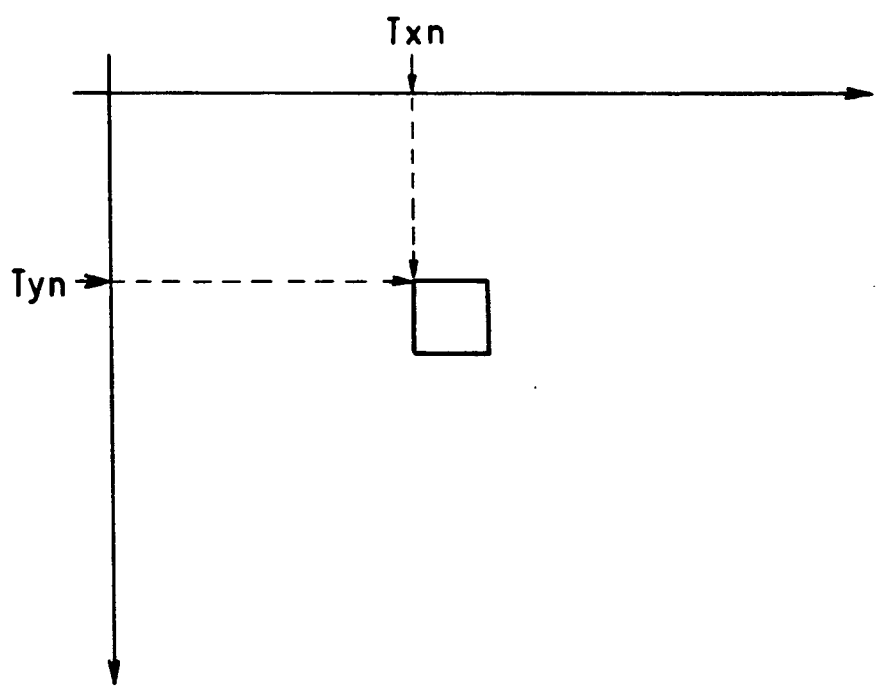
FIG. 27 shows a coordinate of one character region in a text display plane.

On the other hand, FIG. 27 shows an example of a procedure for setting a text coordinate of a character string which is read (recognized) from the input image, and is displayed on the text picture, i.e., on the display picture of the character recognition apparatus according to the present invention.

The text coordinate of each character of the string of the recognized characters is expressed as $T_n=(T_{xn}, T_{yn})$, where n is an index which is attached in correspondence with the above mentioned index n as attached to $G_{xn}$ and $G_{yn}$, and $T_{xn}$ and $T_{yn}$ are respectively X and Y coordinates for displaying the recognized character on the display picture of the character recognition apparatus.

Figure 28:
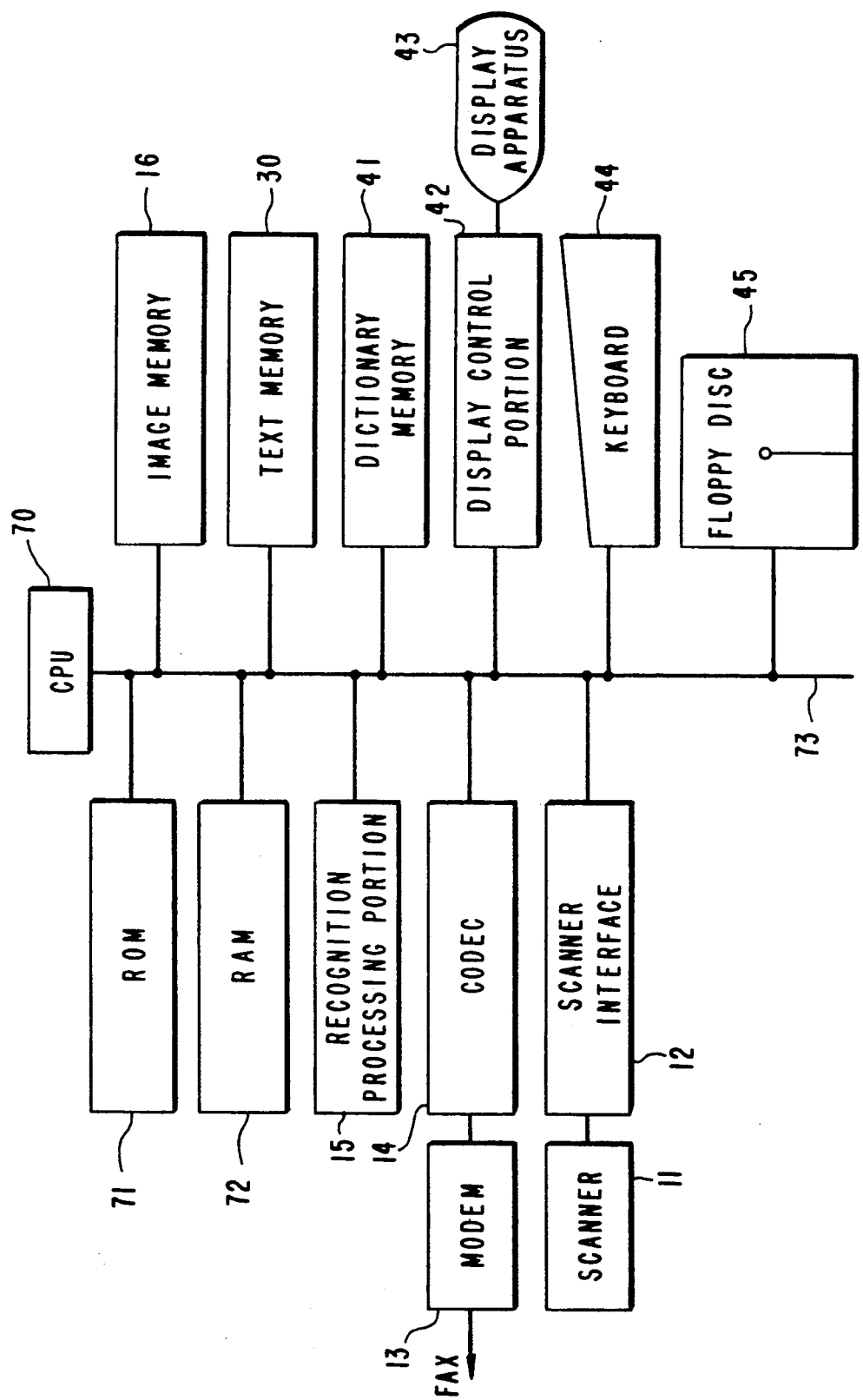
FIG. 28 shows an example of hardware construction for character recognition in an embodiment of the present invention.

FIG. 28 shows the hardware construction of the character recognition apparatus in the embodiment of the present invention.

In FIG. 28, reference numeral 11 denotes a scanner, 12 denotes a scanner interface, 13 denotes a modem, 14 denotes a coder/decoder, 15 denotes a recognition processing portion, 16 denotes an image memory, 30 denotes a text memory, 41 denotes a dictionary memory, 42 denotes a display control portion, 43 denotes a display device, 44 denotes a keyboard, 45 denotes a floppy disc device, 70 denotes a CPU, 71 denotes a ROM, 72 denotes a RAM, and 73 denotes a bus.

The scanner 11 optically reads the image from outside, and is connected to the bus 73 through the scanner interface 12.

The modem 13 and the coder/decoder 14 respectively demodulates a facsimile signal from a telephone line, and decodes the demodulated signal. The decoded image data signal output from the coder/decoder 14 is input on the bus 73.

The input image data which is read by the scanner 11 or input from the telephone line, is once held in the image memory 16 under the control of the CPU 70.

The recognition processing portion 15 carries out an operation for preprocessing the image data, e.g., removing noise or smoothing the image, on the input image data which is held in the image memory 16, and then, recognizes a one character region by the operation shown in FIG. 25 corresponding to the steps 402 to 403 of FIG. 1, and cuts out the one character region. At the same time, the above-mentioned coordinate $G_n=(G_{xn}, G_{yn}, \Delta_{xn}, \Delta_{yn})$ is calculated and is memorized in the RAM 72.

The dictionary memory 41 memorizes the characteristic quantities with a correspondence to the respective character code. The above recognition processing portion 15 further extracts the characteristic data of the character from the one character region which is cutout as above, transforms to a character code corresponding to the characteristic quantity of a character in the dictionary memory 41 which is most similar to the characteristic quantity which is extracted from the one character region as above. The recognition processing portion 15 also carries out the control of the aforementioned thickening/thinning and magnification/reduction operations. The above transformed character code is memorized in the text memory 30.

The recognition processing portion 15 calculates the coordinate $T_n=(T_{xn}, T_{yn})$ for displaying the character which is read (recognized) from the input image, on the display picture, and shown in FIG. 27. The coordinate is memorized in the RAM 72.

Figure 29:
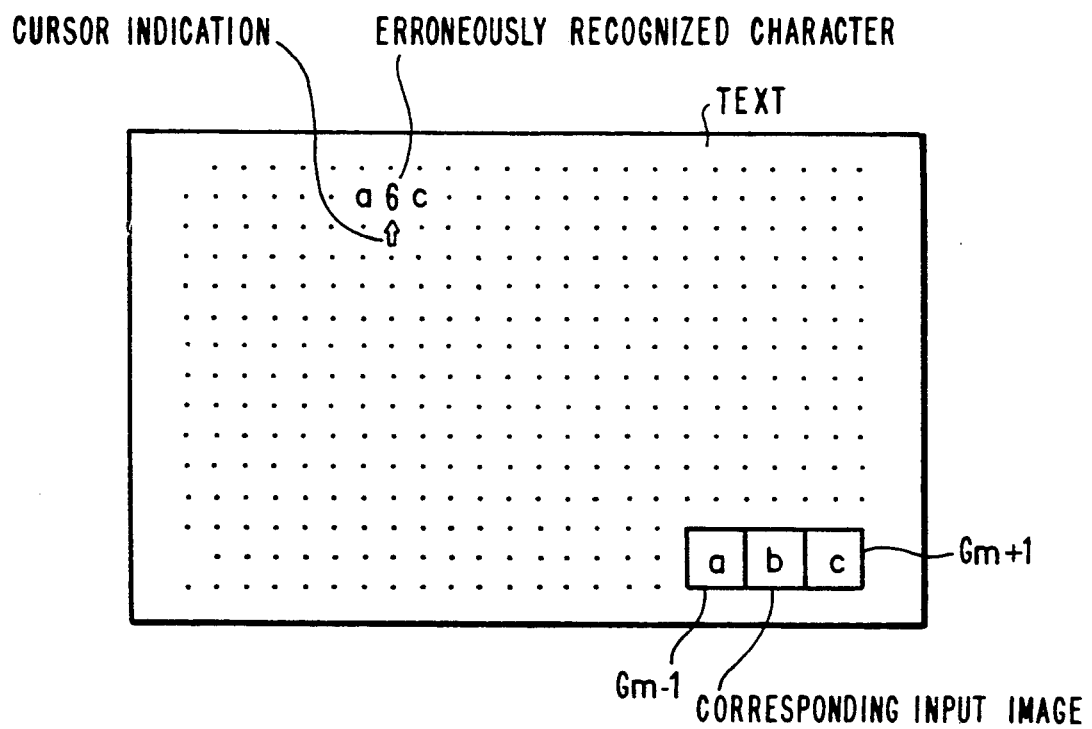
FIG. 29 shows an example of a display image in the eighth embodiment of the present invention.

The above character memorized in the text memory 30 is input into the display control portion 42 together with the coordinate $T_n=(T_{xn}, T_{yn})$ for displaying on the display picture, and the character is displayed on the display picture of the display device 43 under the control of the display control portion 42. FIG. 29 shows an example of the display.

When the operator finds an abnormal portion which seems to be erroneous recognition, in the character string which is read (recognized) from the input image, the operator designates the coordinate $T_m=(T_{xm}, T_{ym})$ of the abnormal portion using the keyboard 44.

For example, in the example shown in FIG. 29, a indication "a6c" is found in the character string (text) which is read (recognized). Accordingly, the operator moves the cursor to point to the indication of "6" as shown in FIG. 29, and performs a predetermined operation on the keyboard 44 for displaying a corresponding input image.

The CPU 70 obtains the coordinate $G_n=(G_{xn}, G_{yn}, \Delta_{xn}, \Delta_{yn})$ of the corresponding one character region on the input image, based on the index n in the above display coordinate $T_m=(T_{xm}, T_{ym})$, and the CPU 70 reads the input image of the one character region which is memorized in the image memory 16, based on the above coordinate $G_m=(G_{xm}, G_{ym}, \Delta_{xm}, \Delta_{ym})$, and makes the display control portion 42 to control the display device 43 to display the image on the display picture.

In the example of FIG. 29, the input image (the coordinate $G_m$) corresponding to the character "6" on the text display, where the coordinate of the input image is designated by the above cursor, the input image (the coordinate $G_{m-1}$) corresponding to the character "a" which precedes the above designated character image, and the input image (the coordinate $G_{m+1}$) corresponding to the character "c" which follows the above designated character image, are displayed in the right bottom part of the text display picture where the read (recognized) character string (text) is displayed.

Thus, the operator can recognize that the original input image corresponding to the above "6" on the text display indicates "b", and the "6" should be corrected to "b".

The corrected document is memorized in the floppy disc 45 in FIG. 28.

Figure 30:
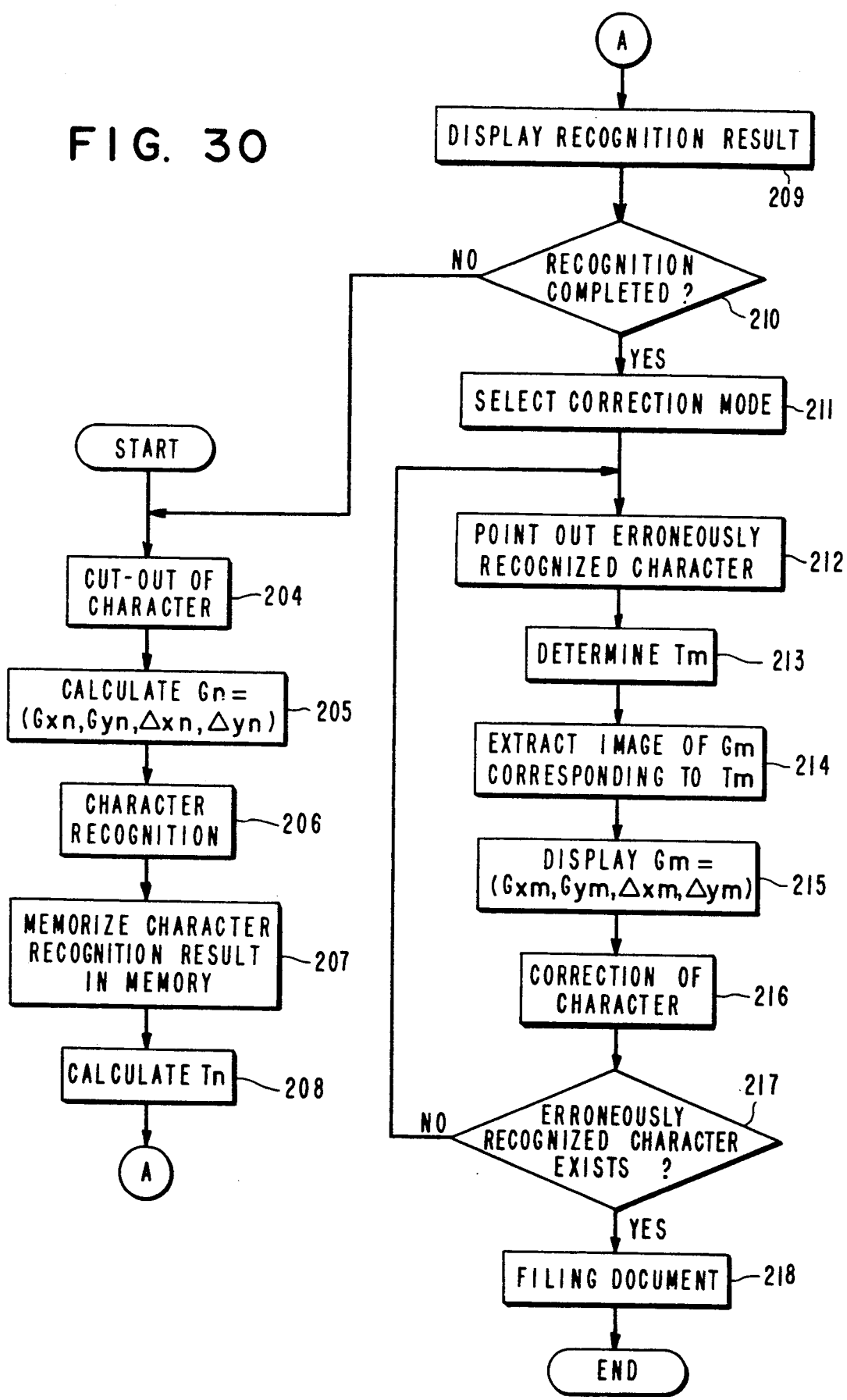
FIG. 30 shows a process in the embodiment of the eighth aspect of the present invention.

FIG. 30 shows the operation procedure of the above construction of FIG. 28.

In the procedure of FIG. 30, the operations in the steps 204 to 210 show a normal procedure of a character recognition (reading), and the operations in the steps 211 to 217 show a procedure for displaying an input image corresponding to an erroneously recognized portion, which includes a characteristic feature of the the present invention.

First, the step 201 corresponds to the stage of optical reading of the image from outside by the scanner 11, or the stage of input of image data signals which is demodulated and decoded from a facsimile signal on the telephone line by the modem 13 and the coder/decoder 14.

In the step 202, the above input image data is held in the image memory 16 under the control of the CPU 70.

In the step 203, a preprocessing, e.g., noise removing, smoothing, or the like, of the above input image data which is held in the image memory 16, is carried out by the recognition processing portion 15.

In the step 204, a cut-out of a one character region as shown in FIG. 26, is carried out by the recognition processing portion 15. Then, in the step 205, the above $G_n = (G_{xn}, G_{yn}, \Delta_{xn}, \Delta_{yn})$ is calculated, and the result is memorized in the RAM 72.

In the step 206, the character recognition is carried out. Namely, a characteristic data of a character is extracted from the above cut-out one character region, and then, the characteristic data is transformed to a character code corresponding to a characteristic data in the dictionary which is most similar to the above extracted characteristic data.

The above transformed character code, i.e., the recognition result is memorized in the text memory 30 in the step 207.

In the step 208, the recognition processing portion 15 calculates the coordinate $T_n = (T_{xn}, T_{yn})$ for displaying the character which is read (recognized) from the input image, on the display picture, and shown in FIG. 27. The coordinate is memorized in the RAM 72.

In the step 209, the above character code memorized in the text memory 30 is input into the display control portion 42 together with the coordinate $T_n = (T_{xn}, T_{yn})$ for displaying on the display picture, and the character is displayed on the display picture of the display device 43 under the control of the display control portion 42.

After all the above operations are carried out for all the input image data, i.e., when it is determined that no character which is to be recognized is left in the step 210, a correction mode is selected in the step 211.

In the step 212, when the operator finds an abnormal portion which seems to be erroneous recognition, in the character string which is read (recognized) from the input image, the operator designates the coordinate $T_m = (T_{xm}, T_{ym})$ of the abnormal portion using the keyboard 44.

In the step 213, the CPU 70 recognizes the above display coordinate $T_m = (T_{xm}, T_{ym})$, and obtains the coordinate $G_m = (G_{xm}, G_{ym}, \Delta_{xm}, \Delta_{ym})$ of the corresponding one character region on the input image, based on the index m in the step 214. Then, the CPU 70 reads the input image of the one character region which is memorized in the image memory 16, based on the above coordinate $G_m = (G_{xm}, G_{ym}, \Delta_{xm}, \Delta_{ym})$, and makes the display control portion 42 control the display device 43 to display the image on the display picture in the step 215.

In the step 216, an input image (coordinate $G_m$) corresponding to the abnormal portion which seems to be erroneous recognition, is confirmed, and if it is determined necessary, the character is corrected.

After the above operations are carried out for all the abnormal portion which seems to be erroneous recognition, i.e., when it is determined that all the abnormal portions which seem to be erroneous recognition, are corrected, the corrected document is filed in the floppy disc 45, and the operation is completed.

As explained above, according to the above construction, the operation for searching for a portion of the original input image corresponding to a character recognition result, can be efficiently carried out without increasing the size of hardware or software, or lowering processing speed.

Figure 31:
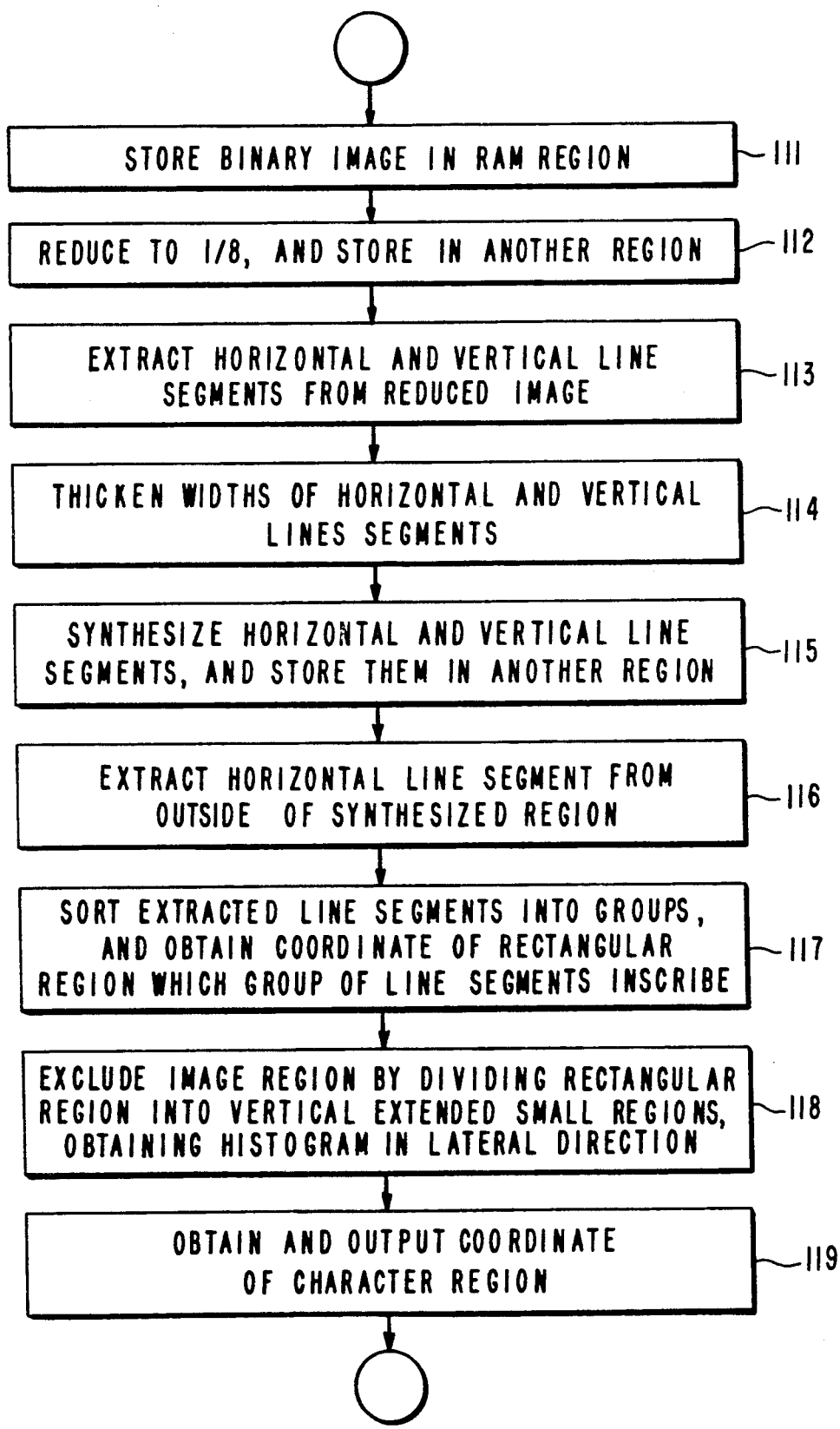
FIG. 31 shows a process in the embodiment of the ninth aspect of the present invention.
Figure 32:
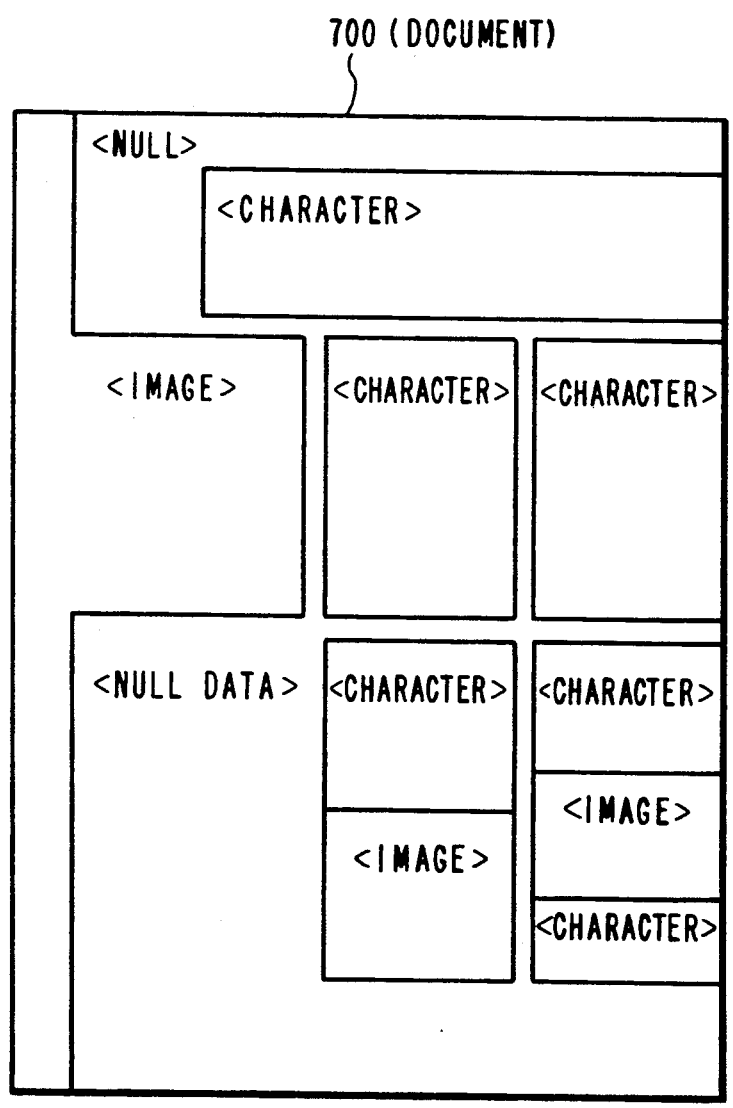
FIG. 32 shows an example of input text image in the embodiment of the ninth aspect of the present invention.

FIG. 31 shows an operation procedure of the recognition control portion 15 in FIG. 28 in the embodiment of the ninth aspect of the present invention. FIG. 32 shows an example of a document image 700 which is read by the scanner 11 (FIG. 28).

As shown in FIG. 31, the document image includes a portion comprised of character strings and an image portion comprised of pictures and photographs, which portions are mixed with each other, and the sentences are written in the horizontal direction.

When the read data of the document image 700 is given from the scanner 11 to the recognition control portion 15 in the character recognition apparatus, the read data is transformed to binary data, and the binary image data is stored in the image memory 16 (step 111 in FIG. 31).

Next, the binary image is reduced to one-eighth, and the reduced image is stored in the image memory 16 (step 112).

Then, a line segment which has a length more than a predetermined length, and is contained in space region wherein all data is white (zero) in the reduced image, is extracted (step 113).

In the above operation, the extraction of the line segment is carried out in the horizontal and vertical directions independently of each other. Regarding the vertical direction, when all dots in a rectangular region having a predetermined length and a predetermined width, e.g., 8 dots in the vertical direction and 3 dots in the horizontal direction, are zero (white), a line segment having a one dot width and located in the center of the rectangular region, is extracted as "a line segment comprised of spaces only".

Regarding the horizontal direction, when all dots in a rectangular region having a predetermined length and a predetermined width, e.g., 7 dots in the vertical direction and 8 dots in the horizontal direction, are zero (white), where the width in the vertical direction is predetermined so that a space region between the adjacent character strings is not detected, a line segment having a one dot width and located in the center of the rectangular region, is extracted as "a line segment comprised of spaces only".

Figure 33:
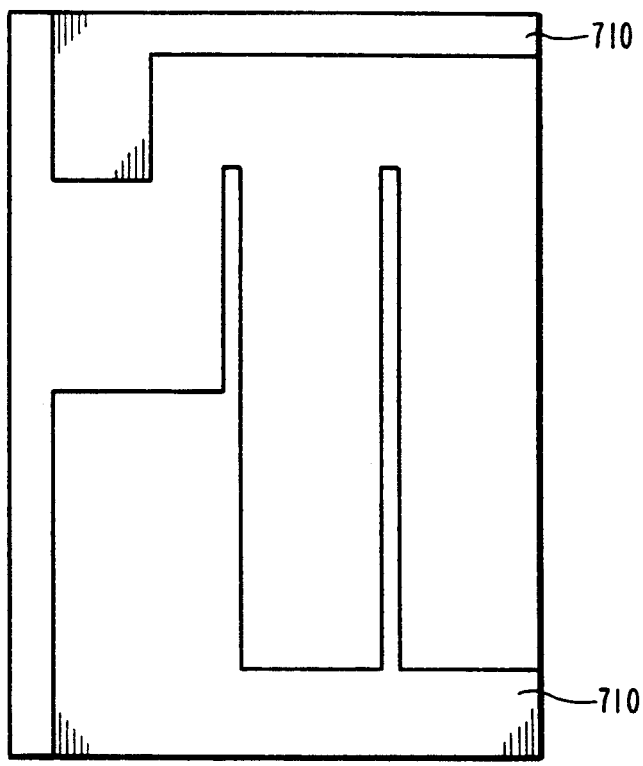
FIG. 33 shows an aggregation of extracted vertical line segments in the embodiment of the ninth aspect of the present invention.
Figure 34:
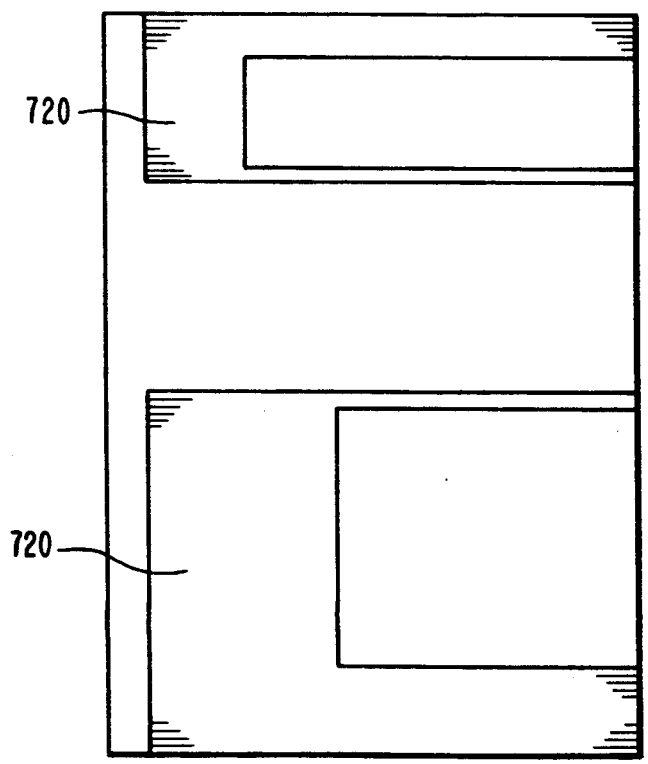
FIG. 34 shows an aggregation of extracted longitudinal line segments in the embodiment of the ninth aspect of the present invention.

FIGS. 33 and 34 respectively show the results of the extractions of the vertical line segment and the horizontal line segment from the document image 700 of FIG. 32 by the above procedure. The aggregation of the vertical line segments 710 in FIG. 33, and the aggregation of the horizontal line segments 720 in FIG. 34, are extracted from the image which is obtained by reducing the binary image of the document 700 of FIG. 32 to one-eighth.

After the above aggregation of the vertical line segments 710 in FIG. 33, and the aggregation of the horizontal line segments 720 in FIG. 34, are extracted as above, next, in the step 114, the widths of the vertical line segment and the horizontal line segment are magnified, and in the step 115, an image which is obtained by composing the width-magnified aggregations of the vertical line segments and the horizontal line segments, dot by dot, is stored in the image memory 16.

Figure 35A:
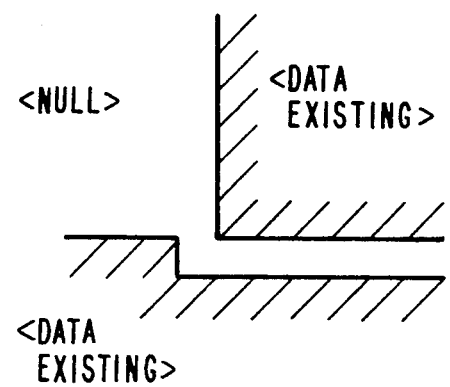
FIGS. 35A to 35C are explanatory diagrams of a composing operation of extracted line segments in the ninth aspect of the present invention.
Figure 35B:
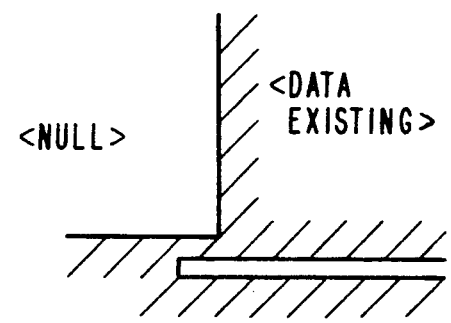
Figure 35C:
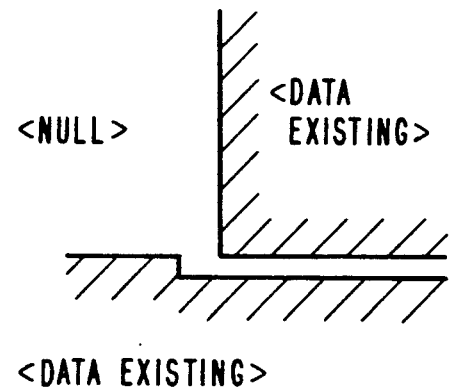
Figure 36:
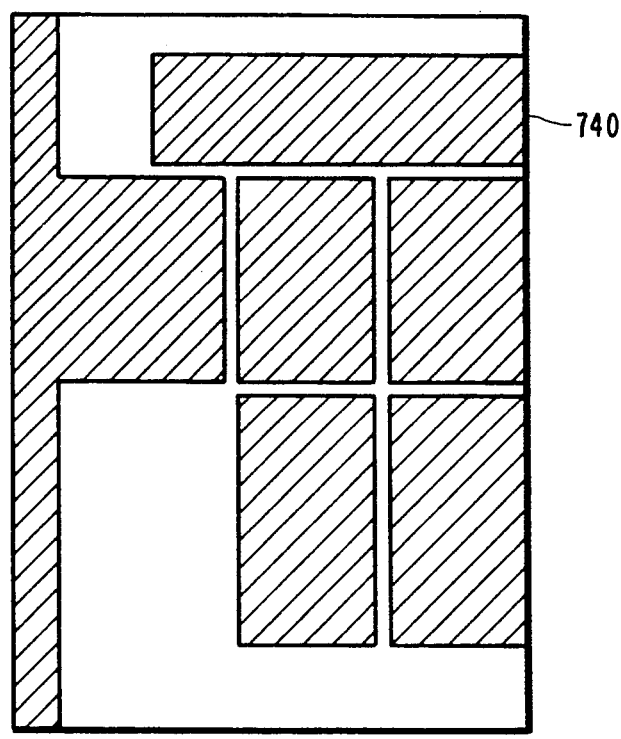
FIG. 36 shows a composed image of the aggregation of the vertical line segments in FIG. 33, and the aggregation of the longitudinal line segments in FIG. 34.

FIGS. 35A to 35C is provided for explaining the operation of composing the extracted line segments.

If the aggregations of the vertical line segments and the horizontal line segments which are extracted from the image of FIG. 35A, are composed without magnification, the composed image becomes as shown in FIG. 35B. Namely, since the width of the above-mentioned rectangular region is larger than one dot, the space region comprised of an aggregation of the one-dot width line segments in the centers of the above rectangular regions, is narrower than the actual space region in the original image. Therefore, two regions which are not null (space) regions, and are apart from each other in the original image, are connected as shown in FIG. 35B.

However, since in this embodiment, in the step 114, the width of the line segment in the vertical direction is magnified to the width of the above-mentioned rectangular region, even in the complicated image as shown in FIG. 35A, two regions which are not null (space) regions, and are apart from each other in the original image, are maintained to be apart from each other even after the composing operation.

In this embodiment, corresponding to the width of the above-mentioned rectangular region, the width of the line segment in the vertical direction is magnified by one dot in both of the right and left sides, and the width of the line segment in the horizontal direction is magnified by three dots in both of the up and down sides.

When the above image composed of the line segments is stored in the image memory 16 (step 115), it is assumed here that all dots except the above composed image are one (black), and horizontal line segments are extracted from the assumed black region (step 116).

In this embodiment, the above extraction of the horizontal line segments is carried out at a resolution of one dot in the right-left direction and up-down direction. Therefore, the portion outside the above composed image, is decomposed into horizontal line segments.

Then, line segments which are in contact with each other are attached with the same label (labeling), and a region of a rectangle which circumscribes the line segments to which the same label is attached, are determined (step 118).

In the above determination, the coordinate of the rectangular region (the coordinate of corner points) is obtained (step 117), and the coordinate is stored in the RAM 72 (FIG. 28).

Figure 37A:
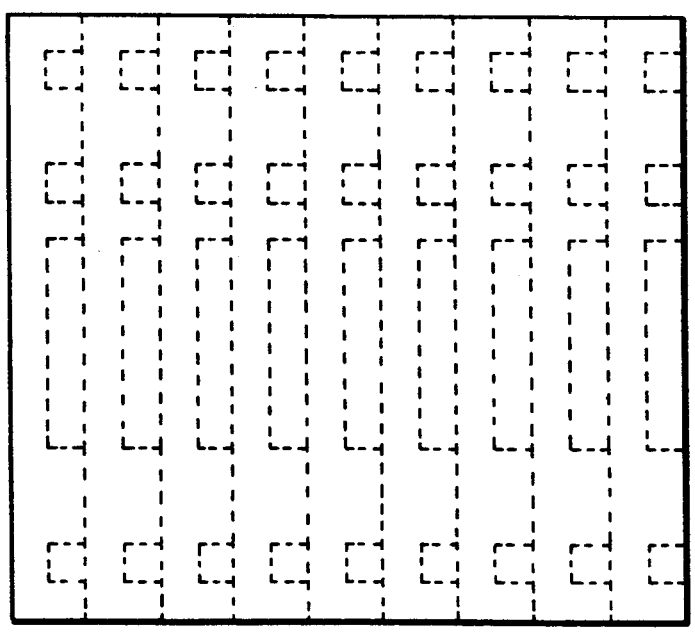
FIGS. 37A and 37B are explanatory diagrams of a dividing operation between a successive character strings region and an image region.
Figure 37B:
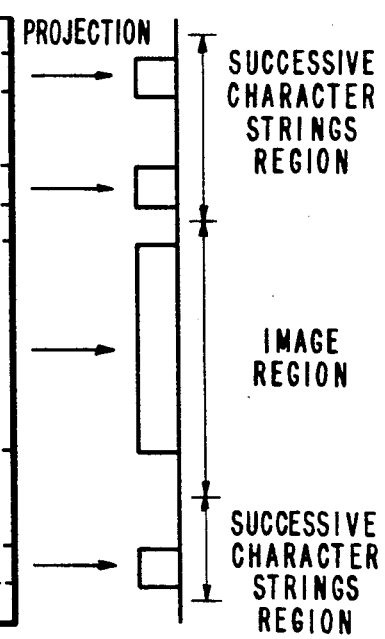
Figure 38:
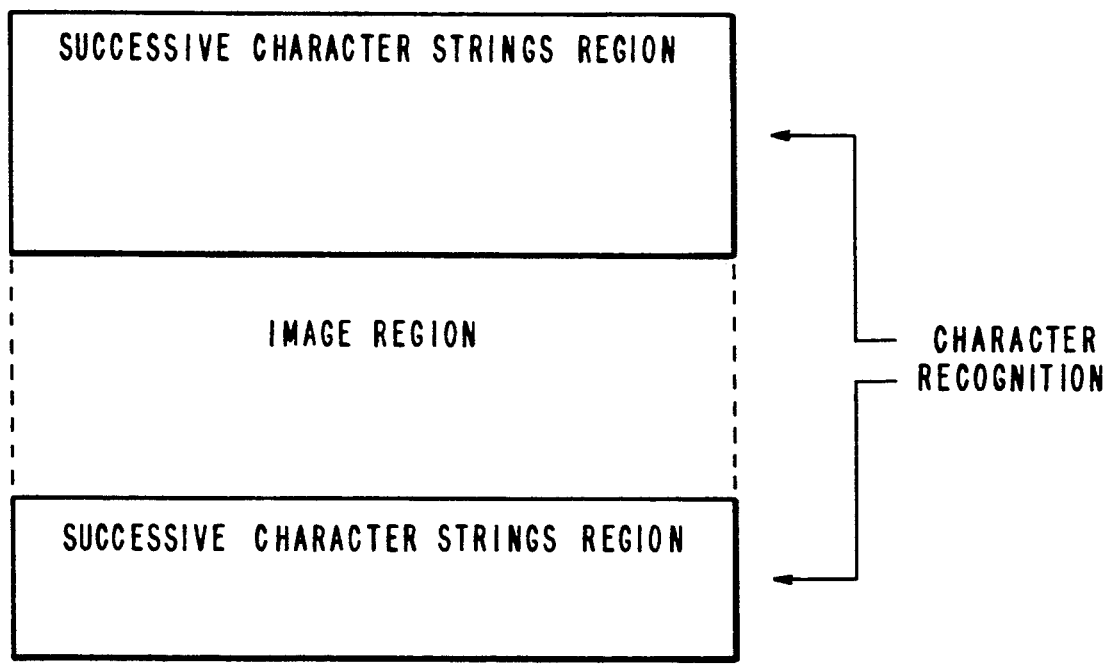
FIG. 38 shows a result of the dividing operation of FIGS. 37A and 37B.

The above rectangular region is divided into vertically long small regions as shown in FIG. 37A, then a horizontal histogram is obtained as shown in FIG. 37B, and finally, image region is removed from the objective rectangular region (step 118).

As shown in FIG. 37B, the region wherein the histogram is intermittent in the vertical direction, corresponds to a successive character strings region, and the region wherein the histogram is not intermittent in the vertical direction, corresponds to an image region, and thus, the successive character strings region is determined by removing the space regions and the the image regions from the above-mentioned reduced image.

The successive character strings region is circumscribed by a rectangle, and the coordinate data of the rectangle is stored in the RAM 72.

When the coordinate data is stored in the RAM 72 as above, and finally a character region is determined, next, the operation goes to the steps 403, 404, . . . , and thus, the operation of character recognition is commenced.

In the operation of character recognition, the above coordinate is multiplied by eight, and a character region on an original binary image, is determined as an object of the character recognition using the eight times-multiplied coordinate data.

As explained above, according to this embodiment, a region which is subjected to the above region dividing operation, is preprocessed line segment by line segment to be sorted into character regions and image regions, and the amount of processed data is small.

Further, since the above regions are determined by attaching the same label to line segments which are in contact with each other, the region of characters can be discriminated from the region of image with high resolution and high speed without using a large size of memory, compared with the conventional method of labeling dot by dot.

In addition, in this embodiment, the width of the line segments for the decomposition is magnified before the composition (step 114), even in processing a document which includes complicated arrangement of space regions, the connection relationship between the space regions is maintained through the processing.

Therefore, the regions outside the space regions can be exactly determined, and the regions of the characters can always be extracted stably.

According to this embodiment, the processing for the discrimination of the regions is carried out on the image which is reduced to one-eighth, the memory size which is necessary for processing can be further reduced, and the processing speed can be further improved. Further, the resolution is not impaired by the above processing in this embodiment.

As explained above, according to the best mode of the present invention, according to the above procedure in the ninth aspect of the present invention, the operation of recognition of the successive character strings region in the step 402 in the conventional procedure in FIG. 1, can be simplified, and the processing speed can be increased.

According to the first to third aspects of the present invention, the modifications for thickening/thinning and magnification/reduction are carried out on image data or on characteristic quantities which are extracted from the image data, thereby the bothersome operation of changing the content of the dictionary can be eliminated, and therefore, the operation of using the character recognition apparatus is made efficient, preventing the erroneous recognition.

According to the second and third aspect of the present invention, the magnification/reduction is carried out on the characteristic quantity which is extracted from image data, and therefore, the processing is remarkably simplified preventing the erroneous recognition, and without deformation of image data.

According to the fourth aspect of the present invention, the modification is carried out with high reliability of recognition by the setting of the optimum parameters, and according to the fifth aspect of the present invention, since the optimum parameters can be set according to the kind of the characters which is to be recognized, the operation of using the character recognition apparatus is made efficient, preventing the erroneous recognition.

In addition, according to the sixth aspect of the present invention, a small deformation in an input image data due to a slippage of a position of the image data or a variation of concentration or a blur, is not recognized as a difference in the characteristic quantity, and thus, degradation of a recognition rate is prevented.

According to the seventh aspect of the present invention, the operation of detecting an erroneously recognized character is made efficient, and according to the eighth aspect of the present invention, the comparison of the erroneously recognized character with the corresponding image subject to the recognition, is made easy, and the operation is made efficient.

We claim:

1. A character recognition apparatus supplied with image data, comprising:

a dictionary for memorizing characteristic quantities of characters;

characteristic quantity extracting means for extracting a characteristic quantity of a character included within the image data;

character search means for determining the character included within the image data by comparing the characteristic quantity which is extracted from the image data with the characteristic quantities of characters which are memorized in the dictionary; and characteristic quantity magnification/reduction means for carrying out a modification of said characteristic quantity which is extracted from said image data, where said modification corresponds to at least one of magnification and reduction operations of said image data to equalize the scale of the character included within the image data with the scale of at least one of the characters of which the characteristic quantities are memorized in said dictionary, before said comparison, said at least one of magnification and reduction operations of the image data by said characteristic quantity magnification/reduction means including the use of one or more parameters which correspond to the at least one of magnification and reduction operations, said character recognition apparatus further comprising:

optimum parameter determining means for obtaining an optimum parameter of a modification by carrying out a modification of a characteristic quantity which is extracted from a known image data, where said modification corresponds to at least one of the magnification and reduction operations of said known image data using each of a predetermined number of parameters, and then comparing the modified characteristic quantity with characteristic quantities which are memorized in the dictionary and which correspond to said known image data, said comparison by said character search means being carried out by obtaining a plurality of values which indicate degrees of similarity between said characteristic quantity extracted from said image data and respective characteristic quantities memorized in said dictionary, said determination of the character by said character search means being carried out by obtaining a character among the characters in the dictionary which has the highest similarity to the character included within the image data based on said plurality of values, and said character search means further determining a recognition reliability based on the similarity of the determined character, said character recognition apparatus further comprising:

low recognition reliability determining means for determining whether a recognition reliability of a determined character is equal to or below a first threshold value; and optimum parameter determination starting means for obtaining an optimum parameter by restarting said optimum parameter determining means when the recognition reliability of the determined character is equal to or below said first threshold value.

2. A character recognition apparatus supplied with image data, comprising:

a dictionary for memorizing characteristic quantities of characters;

characteristic quantity extracting means for extracting a characteristic quantity of a character included within the image data;

character search means for determining the character included within the image data by comparing the characteristic quantity which is extracted from the image data with the characteristic quantities of characters which are memorized in the dictionary; and characteristic quantity magnification/reduction means for carrying out a modification of said characteristic quantity which is extracted from said image data, where said modification corresponds to at least one of magnification and reduction operations of said image data to equalize the scale of the character included within the image data with the scale of at least one of the characters of which the characteristic quantities are memorized in said dictionary, before said comparison, said characteristic quantities each being expressed by a vector quantity comprised of a plurality of components, each of said plurality of values which quantitatively indicate degrees of similarity being a function of absolute values of differences between respective corresponding ones of the plurality of components of the vector quantities of said characteristic quantity extracted from said image data and the characteristic quantities memorized in said dictionary, said character recognition apparatus further comprising:

small difference determining means for determining whether each of said absolute values of differences between respective corresponding ones of the plurality of components, is equal to or below a second threshold value in said comparison; and error accumulation preventing means for replacing each absolute value among said absolute values of differences between respective corresponding ones of the plurality of components with zero before said operation of obtaining said plurality of values which indicate degrees of similarity, when the absolute value is equal to or below said second threshold value, the second threshold value being a value commonly used for the comparisons with absolute values corresponding to all the vector components.

3. A character recognition apparatus supplied with image data, comprising:

a dictionary for memorizing characteristic quantities of characters;

characteristic quantity extracting means for extracting a characteristic quantity of a character included within the image data;

character search means for determining the character included within the image data by comparing the characteristic quantity which is extracted from the image data with the characteristic quantities of characters which are memorized in the dictionary; and characteristic quantity magnification/reduction means for carrying out a modification of said characteristic quantity which is extracted from said image data, where said modification corresponds to at least one of magnification and reduction operations of said image data to equalize the scale of the character included within the image data with the scale of at least one of the characters of which the characteristic quantities are memorized in said dictionary, before said comparison, said comparison in said character search means being carried out by obtaining a plurality of values which indicate degrees of similarity between said characteristic quantity extracted from said image data and respective characteristic quantities memorized in said dictionary, said determination of the character in said character search means being carried out by obtaining a character among the characters in the dictionary which has the highest similarity to the character included within the image data based on said plurality of values, said character search means further determining a recognition reliability based on the similarity of the determined character, said character recognition apparatus further comprising erroneous recognition character determining means for determining whether the determined recognition reliability is equal to or below a third threshold value after the character is determined so that an inaccurate recognition is detected; and erroneous recognition character indicating means for indicating that said character is determined based on the inaccurate recognition, when the determined recognition reliability is equal to or below said third threshold value.

4. A character recognition apparatus supplied with image data, comprising:

image input means for inputting an image of a document comprised of a plurality of character regions, as the image data;

character region recognizing means for recognizing one of the plurality of character regions indicating an individual character included within said image data;

a dictionary for memorizing characteristic quantities of characters;

characteristic quantity extracting means for extracting a characteristic quantity included within the image data in said one of the plurality of character regions;

character search means for determining the individual character included within the image data by comparing the characteristic quantity which is extracted from the image data with the characteristic quantities of characters which are memorized in the dictionary;

text displaying means for displaying said determined characters on the display apparatus in the order that the corresponding one of the plurality of character regions is located in said image of the document;

characteristic quantity magnification/reduction means for carrying out a modification of said characteristic quantity which is extracted from said image data, where said modification corresponds to at least one of magnification and reduction operations of said image data to equalize the scale of the individual character with the scale of at least one of the characters of which the characteristic quantities are memorized in said dictionary, before said comparison; and text image coordinate-corresponding memorizing means for memorizing coordinates for displaying the character on said display apparatus by said text displaying means with a correspondence to the order that the corresponding character regions are located in said image of the document.

5. A character recognition apparatus supplied with image data, comprising:

successive character strings region recognizing means for recognizing a successive character strings region including a plurality of successive character strings which include a plurality of character regions, said successive character strings region being included within the image data and said plurality of character strings being printed at intervals in the character strings region, and a continuous image region;

character string region recognizing means for recognizing each of the plurality of successive character strings in said successive character strings region;

character region recognizing means for recognizing each of the plurality of character regions indicating an individual character, from said image data;

a dictionary for memorizing characteristic quantities of characters;

characteristic quantity extracting means for extracting characteristic quantities of characters included within the image data in each of the plurality of character regions; and character search means for determining the characters included within the image data by comparing the characteristic quantity which are extracted from the image data with the characteristic quantities of characters which are memorized in the dictionary;

characteristic quantity modification means for carrying out a modification of said characteristic quantity which is extracted from said image data, where said modification corresponds to at least one of magnification and reduction operations of said image data to equalize the scale of the character included within the image data with the scale of at least one of the characters of which the characteristic quantities are memorized in said dictionary before said comparison, wherein said successive character strings region recognizing means comprises:

X-direction /Y-direction space string region extracting means for extracting a string region consisting of successive spaces (0 data) extending over a predetermined width and over a predetermined length, in each of the X and Y directions, to provide an X-direction space string region and a Y-direction space string region;

intermediate image composing means for composing a logical multiplication of an X-direction intermediate image and a Y-direction intermediate image to provide an intermediate image, each X-direction intermediate image and Y-direction intermediate image being included within the image data, where all data in said X-direction space string region is "zero" and all other data is "one" in said X-direction intermediate image, and all data in said Y-direction space string region is "zero" and all other data is "one" in said Y-direction intermediate image;

successive data "one" region recognizing means for recognizing a successive data "one" region in the intermediate image which is obtained by said composing operation, in a manner that a label is assigned to each of successive linear regions in the intermediate image obtained by said composing operation, where each of the plurality of successive character string regions in each of the plurality of groups contains data "one" only, extends over a predetermined width and over a predetermined length in the X-direction or the Y-direction; and character string region determining means for projecting said image data in the direction of the character strings in a region of the image data corresponding to said successive data "one" region, and for determining a part of the image data corresponding to the projected image as the character string region when the width of the projected image is equal to or less than a predetermined width.

6. A character recognition apparatus according to claim 5, wherein said at least one of magnification and reduction operations of the image data by said characteristic quantity magnification/reduction means includes the use of one or more parameters corresponding to the at least one of magnification and reduction operations, wherein said comparison by said character search means is carried out by obtaining a plurality of values quantitatively indicating degrees of similarity between the characteristic quantity which is extracted from said image data, and the characteristic quantities which are memorized in said dictionary, wherein said determination of the character by said character search means is carried out by obtaining a character among the characters in the dictionary which has the highest similarity to the characters included within the image data based on said plurality of values, wherein a recognition reliability is determined for the character based on the determined similarity, wherein said characteristic quantities are each expressed by a vector quantity comprised of a plurality of components, wherein each of said plurality of values quantitatively indicating similarities are each a function of absolute values of differences between corresponding ones of the plurality of components of the vector quantities of said characteristic quantity extracted from the image data an the characteristic quantities memorized in the dictionary, said character recognition apparatus further comprising:

optimum parameter determining means for obtaining an optimum parameter of a modification by carrying out a modification of a characteristic quantity which is extracted from a known image data, where said modification corresponds to the at least one of magnification and reduction operations of said known image data using each of a predetermined number of parameters, and then comparing the modified characteristic quantity with a characteristic quantity which is memorized in the dictionary and which corresponds to said known image data;

optimum parameter determination starting means for obtaining an optimum parameter by restarting said optimum parameter determining means when the recognition reliability of the determined character is equal to or below a first threshold value;

small difference determining means for determining whether each of said absolute values of differences between respective corresponding ones of the plurality of components, is equal to or below a second threshold value in said comparison; and error accumulation preventing means for replacing each absolute value among said absolute values of differences between respective corresponding ones of the plurality of components with zero before said operation of obtaining said plurality of values which indicate degrees of similarity, when the absolute value is equal to or below said second threshold value.

7. A character recognition apparatus supplied with image data, comprising:

a dictionary for memorizing characteristic quantities of characters;

characteristic quantity extracting means for extracting a characteristic quantity of a character included within the image data;

character search means for determining the character included within the image data by comparing the characteristic quantity which is extracted from the image data with the characteristic quantities of characters which are memorized in the dictionary;

character image modification means for carrying out a modification of said image data in said character region, where said modification includes at least one of thickening and thinning operations of the character included within the image data, and where said modification includes the use of one or more parameters;

characteristic quantity modification means, preceding in the next stage of said characteristic quantity extracting means, for carrying out a modification of said characteristic quantity which is extracted from said image data, where said modification corresponds to at least one of magnification and reduction operations which includes the use of one or more parameters;

optimum modification parameter determining means for obtaining an optimum parameter of a modification by carrying out a modification of a characteristic quantity which is extracted from a known image data using each of a predetermined number of parameters, and then comparing the modified characteristic quantity with a characteristic quantity which is memorized in the dictionary and which corresponds to said known image data, said comparison by said character search means being carried out by obtaining a plurality of values which indicate degrees of similarity between said characteristic quantity extracted from said image data and respective characteristic quantities memorized in said dictionary, said determination of the character by said character search means being carried out by obtaining a character among the characters in the dictionary which has the highest similarity to the character included within the image data based on said plurality of values, said character search means further determining a recognition reliability based on the similarity of the determined character, said character recognition apparatus further comprising:

low recognition reliability determining means for determining whether a recognition reliability of a determined character is equal to or below a first threshold value; and optimum parameter determination starting means for obtaining an optimum parameter by restarting said optimum parameter determining means when the recognition reliability of the determined character is equal to or below said first threshold value.

8. A character recognition apparatus supplied with image data, comprising:

a dictionary for memorizing characteristic quantities of characters;

characteristic quantity extracting means for extracting a characteristic quantity of a character included within the image data;

character search means for determining the character included within the image data by comparing the characteristic quantity which is extracted from the image data with the characteristic quantities of characters which are memorized in the dictionary;

character image modification means for carrying out a modification of said image data in said character region, where said modification includes at least one of thickening and thinning operations of the character included within the image data, and where said modification includes the use of one or more parameters;

characteristic quantity modification means, preceding in the next stage of said characteristic quantity extracting means, for carrying out a modification of said characteristic quantity which is extracted from said image data, where said modification corresponds to at least one of magnification and reduction operations which includes the use of one or more parameters;

optimum modification parameter determining means for obtaining an optimum parameter of a modification by carrying out a modification of a characteristic quantity which is extracted from a known image data using each of a predetermined number of parameters, and then comparing the modified characteristic quantity with a characteristic quantity which is memorized in the dictionary and which corresponds to said known image data, said characteristic quantities each being expressed by a vector quantity comprised of a plurality of components, each of said plurality of values which quantitatively indicate degrees of similarity being a function of absolute values of differences between respective corresponding ones of the plurality of components of the vector quantities of said characteristic quantity extracted from said image data and the characteristic quantities memorized in said dictionary, said character recognition apparatus further comprising:

small difference determining means for determining whether each of said absolute values of differences between respective corresponding ones of the plurality of components is equal to or below a second threshold value in said comparison; and error accumulation preventing means for replacing each absolute value among said absolute values of differences between respective corresponding ones of the plurality of components with zero before said operation of obtaining said plurality of values which indicate degrees of similarity, when the absolute value is equal to or below said second threshold value, the second threshold value being a value commonly used for the comparisons with absolute values corresponding to all the vector components.

9. A character recognition apparatus supplied with image data, comprising:

a dictionary for memorizing characteristic quantities of characters;

characteristic quantity extracting means for extracting a characteristic quantity of a character included within the image data;

character search means for determining the character included within the image data by comparing the characteristic quantity which is extracted from the image data with the characteristic quantities of characters which are memorized in the dictionary;

character image modification means for carrying out a modification of said image data in said character region, where said modification includes at least one of thickening and thinning operations of the character included within the image data, and where said modification includes the use of one or more parameters;

characteristic quantity modification means, preceding in the next stage of said characteristic quantity extracting means, for carrying out a modification of said characteristic quantity which is extracted from said image data, where said modification corresponds to at least one of magnification and reduction operations which includes the use of one or more parameters;

optimum modification parameter determining means for obtaining an optimum parameter of a modification by carrying out a modification of a characteristic quantity which is extracted from a known image data using each of a predetermined number of parameters, and then comparing the modified characteristic quantity with a characteristic quantity which is memorized in the dictionary and which corresponds to said known image data, said comparison by said character search means being carried out by obtaining a plurality of values which indicate degrees of similarity between said characteristic quantity extracted from said image data and respective characteristic quantities memorized in said dictionary, said determination of the character by said character search means being carried out by obtaining a character among the characters in the dictionary which has the highest similarity to the character included within the image data based on said plurality of values, said character search means further determining a recognition reliability based on the similarity of the determined character, said character recognition apparatus further comprising:

low recognition reliability determining means for determining whether a recognition reliability of a determined character is equal to or below a first threshold value; and optimum parameter determination starting means for obtaining an optimum parameter by restarting said optimum parameter determining means when the recognition reliability of the determined character is equal to or below said first threshold value, said characteristic quantities being each expressed by a vector quantity comprised of a plurality of components, each of said plurality of values which quantitatively indicate degrees of similarity being a function of absolute values of differences between respective corresponding ones of the plurality of components of the vector quantities of said characteristic quantity extracted from said image data and the characteristic quantities memorized in said dictionary, said character recognition apparatus further comprising:

small difference determining means for determining whether each of said absolute values of differences between respective corresponding ones of the plurality of components is equal to or below a second threshold value in said comparison; and error accumulation preventing means for replacing each absolute value among said absolute values of differences between respective corresponding ones of the plurality of components with zero before said operation ob obtaining said plurality of values which indicate degrees of similarity, when the absolute value is equal to or below said second threshold value, the second threshold value being a value commonly used for the comparisons with absolute values corresponding to all the vector components.

10. A character recognition apparatus supplied with image data, comprising:

image input means for inputting an image of a document comprised of a plurality of character regions, as the image data;

character region recognizing means for recognizing one of the plurality of character regions indicating an individual character included within said image data;

a dictionary for memorizing characteristic quantities of characters;

character image modification means for carrying out a modification of said image data in said character region, where said modification includes at least one of thickening and thinning operations of the character included within the image data, and said at least one of thickening and thinning operations is characterized by one or more parameters;

characteristic quantity extracting means for extracting a characteristic quantity of a character included within said modified image data;

character search means for determining the character included within the image data by comparing the characteristic quantity which is extracted from the image data with the characteristic quantities of characters which are memorized in the dictionary;

characteristic quantity modification means, for carrying out a modification of said characteristic quantity which is extracted from said image data, before said comparison, where said modification correspond to at least one of magnification and reduction operations which includes the use of one or more parameters;

text displaying means including a display apparatus which includes a plurality of coordinates, for displaying said determined characters on the display apparatus in the order that the corresponding ones of the plurality of character regions is located in said image of the document;

optimum modification parameter determining means for obtaining an optimum parameter of a modification by carrying out a modification of a characteristic quantity which is extracted from a known image data using each of a predetermined number of parameters, and then comparing the modified characteristic quantity with a characteristic quantity which is memorized in the dictionary and which corresponds to said known image data; and text image coordinate corresponding memorizing means for memorizing coordinates for displaying said predetermined character on said display apparatus by said text displaying means with a correspondence to the order that the corresponding character regions are located in said image of the document.

11. A character recognition apparatus supplied with image data, comprising:

successive character strings region recognizing means for recognizing a successive character strings region including a plurality of successive character strings which include a plurality of character regions, said successive character strings region being included within the image data and said plurality of character strings being printed at intervals in the character strings region, and a continuous image region;

character string region recognizing mans for recognizing each of the plurality of successive character strings in said successive character strings region;

character region recognizing means for recognizing each of the plurality of character regions indicating an individual character, from said image data;

character image modification means for carrying out a modification of said image data in each of said character regions, where said modification includes at least one of magnification and reduction operations of the scale of a character and at least one of thickening and thinning operations on a character, where said at least one of magnification and reduction operations and said at least one of thickening and thinning operations include the use of one or more parameters;

a dictionary for memorizing characteristic quantities of characters;

characteristic quantity extracting means for extracting a characteristic quantity of a character included within the image data; and character search means for determining the character included within said image data, by comparing the characteristic quantity which is extracted from the image data with the characteristic quantities of characters which are memorized in the dictionary, said character recognition apparatus further comprising:

optimum modification parameter determining means for obtaining an optimum parameter of a modification by carrying out a modification of a characteristic quantity which is extracted from a known image data using each of a predetermined number of parameters, and then comparing the modified characteristic quantity with a characteristic quantity which is memorized in the dictionary and which corresponds to said known image data, wherein said successive character strings region recognizing means comprises:

X-direction /Y-direction space string region extracting means for extracting a string region consisting of successive spaces (0 data) extending over a predetermined width and over a redetermined length, in each of the X and Y directions, to provide an X-direction space string region and a Y-direction space string region;

intermediate image composing means for composing a logical multiplication of an X-direction intermediate image and a Y-direction intermediate image to provide an intermediate image, each X-direction intermediate image and Y-direction intermediate image being included within the image data, where all data in said X-direction space string region is "zero" and all other data is "one" in said X-direction intermediate image, and all data in said Y-direction space string region is "zero" and all other data is "one" in said Y-direction intermediate image;

successive data "one" region recognizing means for recognizing a successive data "one" region in the intermediate image which is obtained by said composing operation, in a manner that a label is assigned to each of successive linear regions in the intermediate image obtained by said composing operation, where each linear region contains data "one" only, extends over a predetermined width and over a predetermined length in the X-direction or the Y-direction; and character string region determining means for projecting said image data in the direction of the character strings in a region of the image data corresponding to said successive data "one" region, and for determining a part of the image data corresponding to the projected image as the character string region when the width of the projected image is equal to or less than a predetermined width.

12. A character recognition apparatus according to claim 11, wherein said comparison by said character search means is carried out by obtaining a plurality of values quantitatively indicating degrees of similarity between the characteristic quantity which is extracted from said image data, and the characteristic quantities which are memorized in said dictionary, wherein said determination by said character among the characters in the dictionary which has the highest similarity to the character included within the image data, and wherein said character search means further determines a recognition reliability based on the similarity of the determined character, wherein said characteristic quantities are each expressed by a vector quantity comprised of a plurality of components, wherein each of said plurality of values which quantitatively indicate degrees of similarity is a function of absolute values of differences between respective corresponding ones of the plurality of components of the vector quantities of said characteristic quantity extracted from the image data and the characteristic quantities memorized in the dictionary, said character recognition apparatus further comprising:

optimum parameter determination starting means for obtaining an optimum parameter by restarting said optimum parameter determining means when the recognition reliability of the determined character is equal to or below a first threshold value; .

13. A character recognition apparatus supplied with image data, comprising:

a dictionary for memorizing characteristic quantities of characters;

character image modification means for carrying out a modification of said image data in each of said character regions, where said modification includes at least one of magnification and reduction operations of the scale of a character and at least one of thickening and thinning operations on a character, where said at least one of magnification and reduction operations include the use of one or more parameters;

characteristic quantity extracting means for extracting a characteristic quantity of a character included within said modified image data;

character search means for determining the character included within the image data, by comparing the characteristic quantity which is extracted from the image data with the characteristic quantities of characters which are memorized in the dictionary; and optimum modification parameter determining means for obtaining an optimum parameter of a modification by carrying out a modification of a characteristic quantity which is extracted from a known image data using each of a predetermined number of parameters, and then comparing the modified characteristic quantity with a characteristic quantity which is memorized in the dictionary and which corresponds to said known image data, said comparison by said character search means being carried out by obtaining a plurality of values which indicate degrees of similarity between said characteristic quantity extracted from said image data and respective characteristic quantities memorized in said dictionary, said determination of the character by said character search means being carried out by obtaining a character among the characters in the dictionary which has the highest similarity to the character included within the image data based on said plurality of values, said character search means further determining a recognition reliability based on the similarity of the determined character, said character recognition apparatus further comprising:

low recognition reliability determining means for determining whether a recognition reliability of a determined character is equal to or below a first threshold value; and optimum parameter determinnation starting means for obtaining an optimum parameter by restarting said optimum parameter determining means when the recognition reliability of the determined character is equal to or below the first threshold value.

14. A character recognition apparatus according to claim 13, wherein said characteristic quantities are each expressed by a vector quantity comprised of a plurality of components, wherein each of said plurality of values which quantitatively indicate degrees of similarity is a function of absolute values of differences between respective corresponding ones of the plurality of components of the vector quantities of said characteristic quantity extracted from said image data and the characteristic quantities memorized in said dictionary, said character recognition apparatus further comprising:

small difference determining means for determining whether each of said absolute values of differences between respective corresponding ones of the plurality of components, is equal to or below a second threshold value in said comparison; and error accumulation preventing means for replacing each absolute value among said absolute values of differences between respective corresponding ones of the plurality of components with zero before said operation of obtaining said plurality of values which indicate degrees of similarity, when the absolute value is equal to or below said second threshold value, the second threshold value being a value commonly used for the comparisons with absolute values corresponding to all the vector components.

15. A character recognition apparatus supplied with image data, comprising:

a dictionary for memorizing characteristic quantities of characters;

character image modification means for carrying out a modification of said image data in each of said character regions, where said modification includes at least one of magnification and reduction operations of the scale of a character and at least one of thickening and thinning operations on a character, where said at least one of magnification and reduction operations include the use of one or more parameters;

characteristic quantity extracting means for extracting a characteristic quantity of a character included within said modified image data;

character search means for determining the character included within the image data, by comparing the characteristic quantity which is extracted from the image data with the characteristic quantities of characters which are memorized in the dictionary; and optimum modification parameter determining means for obtaining an optimum parameter of a modification by carrying out a modification of a characteristic quantity which is extracted from a known image data using each of a predetermined number of parameters, and then comparing the modified characteristic quantity with a characteristic quantity which is memorized in the dictionary and which corresponds to said known image data, said characteristic quantities each being expressed by a vector quantity comprised of a plurality of components, each of said plurality of values which quantitatively indicate degrees of similarity being a function of absolute values of differences between respective corresponding ones of the plurality of components of the vector quantities of said characteristic quantities memorized in said dictionary, said character recognition apparatus further comprising:

small difference determining means for determining whether each of said absolute values of differences between respective corresponding ones of the plurality of components, is equal to or below a second threshold value in said comparison; and error accumulation preventing means for replacing each absolute value among said absolute values of differences between respective corresponding ones of the plurality of components with zero before said operation of obtaining said plurality of values which indicate degrees of similarity, when the absolute value is equal to or below said second threshold value, the second threshold value being a value commonly used for the comparisons with absolute values corresponding to all the vector components.

16. A character recognition apparatus supplied with image data, comprising:

image input means for inputting an image of a document comprises of a plurality of character regions, as the image data;

character region recognizing means for recognizing one of the plurality of character regions indicating an individual character included within said image data;

a dictionary connected to memorize characteristic quantities of characters;

character image modification means for carrying out a modification of said image data in said character region, where said modification includes at least one of thickening and thinning operations of the character included within the image data, and wherein said modification includes the use of one or more parameters;

characteristic quantity extracting means for extracting a characteristic quantity of a character included within the modified image data;

character search means for determining the character included within the image data by comparing the characteristic quantity which is extracted from the image data with the characteristic quantities of characters which are memorized in the dictionary;

characteristic quantity modification means for carrying out a modification of said characteristic quantity which is extracted from said image data, before said comparison, where said modification corresponds to at least one of magnification and reduction operations which includes the use of one or more parameters;

optimum modification parameter determining means for obtaining an optimum parameter of a modification by carrying out a modification of a characteristic quantity which is extracted from a known image data using each of a predetermined number of parameters, and then comparing the modified characteristic quantity which is memorized in the dictionary and which corresponds to said known image data; and wherein said comparison in said character search means is carried out by obtaining values which indicate degrees of similarity between said characteristic quantity extracted from said image data and respective characteristic quantities memorized in said dictionary, wherein said determination of the character in said character search means is carried out by obtaining a character which has the highest similarity among the characters in the dictionary based on said values, wherein said character search means further determines a recognition reliability based on the similarity of the determined character, said character recognition apparatus further comprising:
erroneous recognition character determining means for determining whether or not the determined recognition reliability is equal to or below a predetermined threshold value when each character is determined; and
erroneous recognition character indicating means for indicating that said character is determined based on an erroneous recognition, when the determined recognition reliability is equal to or below said predetermined threshold value.

17. A character recognition apparatus supplied with image data, comprising:
successive character strings region recognizing means for recognizing a successive character strings region including a plurality of successive character strings which include a plurality of character regions, said successive character strings region being included within the image data and said plurality of character strings being printed at intervals in the character strings region, and a continuous image region;
character string region recognizing means for recognizing each of the plurality of successive character strings in said successive character strings region;
character region recognizing means for recognizing each of the plurality of character regions indicating an individual character, from said image data;
character image modification means for carrying out a modification of said image data in each of said character regions, where said modification includes at least one of magnification and reduction operations of the scale of a character and at least one of thickening and thinning operations on a character, where said at least one of magnification and reduction operations and said at least one of thickening and thinning operations include the use of one or more parameters;
a dictionary for memorizing characteristic quantities of characters;
characteristic quantity extracting means for extracting a characteristic quantity of a character included within the modified image data; and
character search means for determining the character included within said image data, by comparing the characteristic quantity which is extracted from the image data with the characteristic quantities of character which are memorized in the dictionary;
optimum modification parameter determining means for obtaining an optimum parameter of a modification by carrying out a modification of a characteristic quantity which is extracted from a known image data using each of a predetermined number of parameters, and then comparing the modified characteristic quantity with a characteristic quantity which is memorized in the dictionary and which corresponds to said known image data,
wherein said comparison in said character search mans is carried out by obtaining values which indicate degrees of similarity between said characteristic quantity extracted from said image data and respective characteristic quantities memorized in said dictionary,
wherein said determination of the character in said character search means is carried out by obtaining a character which has the highest similarity among the characters in the dictionary based on said values,
wherein said character search means further determines a recognition reliability based on the similarity of the determined character,
wherein said characteristic quantity is represented by a vector quantity comprised of a plurality of elements,
said character recognition apparatus further comprising:
low recognition reliability determining means for determining whether or not a recognition reliability of a determined character is equal to or below a first threshold value,
wherein each of said plurality of values which quantitatively indicate degrees of similarity is a function of absolute values of differences between respective corresponding ones of the plurality of components of the vector quantities of said characteristic quantity extracted from said image data and the characteristic quantities memorized in said dictionary,
optimum parameter determination starting means for obtaining an optimum parameter by restarting said optimum parameter determining means when the recognition reliability of the determined character is equal to or below said first threshold value;
small difference determining means for determining whether or not each of said absolute values of differences between said corresponding components, is equal to or below a second threshold value, in said comparison; and
an error accumulation preventing means for replacing each absolute value among said absolute values of differences between said corresponding components, with zero, before said operation of obtaining said values which indicate degrees of similarity, when the absolute value is equal to or below said second threshold value;
wherein said successive character strings region recognizing means comprises:
X-direction /Y-direction space string region extracting means for extracting a string region consisting of successive spaces (0 data) extending over a predetermined width and over a predetermined length, in each of the X and Y directions, to provide an X-direction space string region and a Y-direction space string region;
intermediate image composing means for composing a logical multiplication an of an X-direction intermediate image and a Y-direction intermediate image to provide an intermediate image, each X-direction intermediate image and Y-direction intermediate image being included within the image data, where all data in said X-direction space string region is "zero" and all other data is "one" in said X-direction intermediate image, and all data in said Y-direction space string region is "zero" and all other data is "one" in said Y-direction intermediate image;
successive data "one" region recognizing means for recognizing a successive data "one" region in the intermediate image which is obtained by said composing operation, in a manner that a label is assigned to each of a plurality of successive linear regions in the intermediate image obtained by said composing operation, where each of the plurality of successive linear regions groups contains data "one" only, extends over a predetermined width and over a predetermined length in the X-direction or the Y-direction; and and character string region determining means for projecting said image data in the direction of the character strings in a region of the image data corresponding to said successive data "one" region, and for determining a part of the image data corresponding to the projected image as the character string region when the width of the projected image is equal to or less than a predetermined width.

18. A character recognition apparatus supplied with image data, comprising:

a dictionary for memorizing characteristic quantities of characters;

characteristic quantity extracting means for extracting a characteristic quantity of a character included within the image data; and character search means for determining the character included within the image data by comparing the characteristic quantity which is extracted from the image data with the characteristic quantities of characters which are memorized in the dictionary, wherein said characteristic quantities are each expressed by a vector quantity comprised of a plurality of components, and wherein said plurality of values which quantitatively indicate degrees of similarity is a function of absolute values of differences between respective corresponding ones of the plurality of components of the vector quantities of said characteristic quantity extracted from said image data and the characteristic quantities memorized in said dictionary, said character recognition apparatus further comprising:

small difference determining means for determining whether each of said absolute values of differences between respective corresponding ones of the plurality of components, is equal to or below a second threshold value in said comparison; and error accumulation preventing means for replacing each absolute value among said absolute values of differences between respective corresponding ones of the plurality of components with zero before said operation of obtaining said plurality of values which indicate degrees of similarity, when the absolute value is equal to or below said second threshold value, the second threshold value being a value commonly used for the comparisons with absolute values corresponding to all the vector components.

19. A character recognition apparatus supplied with image data, comprising:

a dictionary for memorizing characteristic quantities of characters;

characteristic quantity extracting means for extracting a characteristic quantity of a character included within the image data; and character search means for determining the character included within the image data by comparing the characteristic quantity which is extracted from the image data with the characteristic quantities of characters which are memorized in the dictionary, wherein said characteristic quantity is expressed by a vector quantity comprised of a plurality of components, and wherein said comparison by said character search means is carried out by obtaining a plurality of values which indicate degrees of similarity between said characteristic quantity extracted from said image data and respective characteristic quantities memorized in said dictionary, wherein said determination of the character by said character search means is carried out by obtaining a character among the characters in the dictionary which has the highest similarity to the character included within the image data based on said plurality of values, wherein said character search means further determines a recognition reliability based on the similarity of the determined character, said character recognition apparatus further comprising:

an erroneous recognition character determining means for determining whether the determined recognition reliability is equal to or below a third threshold value after the character is determined so that an inaccurate recognition is detected; and erroneous recognition character indicating means for indicating that the character is determined based on the inaccurate recognition, when the determined recognition reliability is equal to or below said third threshold value.

20. A character recognition apparatus supplied with image data, comprising:

successive character strings region recognizing means for recognizing a successive character strings region including a plurality of successive character strings which include a plurality of character regions, said successive character strings region being included within the image data and said plurality of character strings being printed at intervals in the character strings region, and a continuous image region;

character string region recognizing means for recognizing each of the plurality of successive character strings in said successive character strings region;

character region recognizing means for recognizing each of the plurality of character regions indicating an individual character, from said image data;

a dictionary for memorizing characteristic quantities of characters;

characteristic quantity extracting means for extracting a characteristic quantity of a character included within the image data in each of the plurality of character regions; and character search means for determining the character included within the image data by comparing the characteristic quantity which is extracted from the image data with the characteristic quantities of characters which are memorized in the dictionary, wherein said successive character strings region recognizing means comprises:

X-direction /Y-direction space string region extracting means for extracting a string region consisting of successive spaces (0 data) extending over a predetermined width and over a predetermined length, in each of the X and Y directions, to provide an X-direction space string region and a Y-direction space string region;

intermediate image composing means for composing a logical multiplication of an X-direction intermediate image and a Y-direction intermediate image to provide an intermediate image, each X-direction intermediate image and Y-direction intermediate image being included within the image data, where all data in said X-direction space string region is "zero" and all other data is "one" in said X-direction intermediate image, and all data in said Y-direction space string region is "zero" and all other data is "one" in said Y-direction intermediate image;

successive data "one" region recognizing means for recognizing a successive data "one" region in the intermediate image which is obtained by said composing operation, in a manner that a label is assigned to a linear region in the intermediate image obtained by said composing operation, and another linear region in the intermediate image, and is in contact with the linear region to which said label is assigned; and character string region determining means for projecting said image data in the direction of the character strings in a region of the image data corresponding to said successive data "one" region, and for determining a part of the image data corresponding to the projected image as the character string region when the width of the projected image is equal to or less than a predetermined width.

21. A character recognition apparatus according to claim 20, further comprising:

erroneous recognition character determining means for determining whether the determined recognition reliability is equal to or below a third threshold value after the character is determined so that an inaccurate recognition is detected; and erroneous recognition character indicting means for indicating that said character is determined based on the inaccurate recognition, when the determined recognition reliability is equal to or below said third threshold value.

* * * * *